United States Patent
Gamache et al.

(10) Patent No.: US 11,474,043 B2
(45) Date of Patent: Oct. 18, 2022

(54) PLASMA-BASED DETECTOR AND METHODS USING THE SAME FOR MEASURING AND MONITORING PROPERTIES OF A GAS FLOW

(71) Applicant: MÉCANIQUE ANALYTIQUE INC., Thetford-Mines (CA)

(72) Inventors: Yves Gamache, Thetford-Mines (CA); André Lamontagne, Thetford-Mines (CA)

(73) Assignee: MECANIQUE ANALYTIQUE INC., Thetford-Mines (CA)

( * ) Notice: Subject to any disclaimer, the term of this patent is extended or adjusted under 35 U.S.C. 154(b) by 17 days.

(21) Appl. No.: 17/045,399

(22) PCT Filed: Apr. 5, 2019

(86) PCT No.: PCT/CA2019/050418
§ 371 (c)(1),
(2) Date: Apr. 15, 2021

(87) PCT Pub. No.: WO2019/191849
PCT Pub. Date: Oct. 10, 2019

(65) Prior Publication Data
US 2021/0156805 A1  May 27, 2021

Related U.S. Application Data

(60) Provisional application No. 62/653,688, filed on Apr. 6, 2018.

(51) Int. Cl.
*G01N 21/67* (2006.01)

(52) U.S. Cl.
CPC ..... *G01N 21/67* (2013.01); *G01N 2201/1218* (2013.01)

(58) Field of Classification Search
CPC ................. G01N 21/67; G01N 21/01; G01N 2201/1218; G01N 2201/023; G01N 30/64
See application file for complete search history.

(56) References Cited

U.S. PATENT DOCUMENTS

| 4,898,465 | A | 2/1990 | Gerrit et al. |
| 7,791,037 | B1 * | 9/2010 | Wedding ................. H01J 11/18 250/374 |

(Continued)

FOREIGN PATENT DOCUMENTS

| RU | 2422812 C1 | 6/2011 |
| WO | 2016141463 A1 | 9/2016 |

OTHER PUBLICATIONS

Fliegel, D. et al. "Electrical characteristics of a millisecond pulsed glow discharge" Spectrochimica ACTA. Part B: Atomic Spectroscopy, New York, NY, US vol. 63, No. 6, Jun. 1, 2008, pp. 630-637, XP022732148.

*Primary Examiner* — Sang H Nguyen
(74) *Attorney, Agent, or Firm* — Volpe Koenig

(57) ABSTRACT

There is provided a method for measuring a composition of a gas circulating through a plasma-based detector, the plasma-based detector having a discharge chamber defining an internal volume and having discharge electrodes configured to apply a plasma-generating field across the discharge chamber. The method includes ramping a voltage until it reaches a breakdown voltage to generate a plasma, detecting the presence of the plasma, determining a pressure based on the breakdown voltage upon detection of the presence of the plasma, operating the detector at an operation voltage greater than the breakdown voltage, performing measurement(s) on the plasma, generating a detector signal based the measurement(s) and compensating the detector signal based on the determined pressure to obtain a compensated detector signal, the compensated detector signal being representative (Continued)

of the composition of the gas. A plasma-based detector for measuring the composition of the gas is also provided.

21 Claims, 15 Drawing Sheets

(56) References Cited

U.S. PATENT DOCUMENTS

| | | | |
|---|---|---|---|
| 8,471,470 B1* | 6/2013 | Wedding | H01J 11/18 |
| | | | 313/582 |
| 2013/0000412 A1 | 1/2013 | Korenev | |
| 2017/0315012 A1 | 11/2017 | Swinney et al. | |
| 2018/0038800 A1* | 2/2018 | Gamache | G01J 3/443 |
| 2018/0038832 A1* | 2/2018 | Gamache | G01N 30/64 |
| 2018/0059058 A1* | 3/2018 | Fan | G01N 27/66 |
| 2018/0164219 A1* | 6/2018 | Gamache | G01N 21/67 |

* cited by examiner

PLASMA-BASED DETECTOR AND METHODS USING THE SAME FOR MEASURING AND MONITORING PROPERTIES OF A GAS FLOW

RELATED PATENT APPLICATION

This application claims priority of U.S. patent application 62/653,688 filed on Apr. 6, 2018, the specification of which is hereby incorporated by reference.

TECHNICAL FIELD

The technical field generally relates to a plasma-based detector and methods using the same, and more particularly to methods for measuring a composition of a gas circulating through a plasma-based detector.

BACKGROUND

In the manufacturing industries, for example electronics wafer and analytical manufacturers, gas purity is a critical factor. Indeed, in some applications, such as the manufacturing of integrated electronic circuits, a low level of impurities (e.g., a few ppm) in a gas flow used during the manufacturing process could lead to product damage, which is translated in non-negligible loss for the manufacturers In the analytical business, small size gas purifiers are sometimes used to supply pure gas to various gas analysers, such as a gas chromatograph or a mass spectrometer. When a gas purifier is of poor quality or comes close to the end of its life, the purification efficiency of the gas purifier is reduced, and may also release by-products, which may in turn result in instrument malfunction. An example of malfunction in a mass spectrometer is when the ionisation and vacuum zones become coated with some compounds that make the instrument unstable.

In almost every case, instrument malfunctions are associated with time-consuming and costly repair.

Gas purifiers are typically made of a Zr/Vn/Fe alloy and are used to purify noble gases. A gas purifier can also be made of a Zn/Vn alloy to purify $N_2$. The gas purifiers are typically operated at high temperatures, for example between 450° C. to 500° C. The abovementioned alloys, when operated under these conditions may become a catalyst, or a reactor when exposed to a high level of impurities, and potentially generate by-products, which could be detrimental for the process or analytical instrument. The most common failure mode of purifiers based on Zr/Vn/Fe is the release of $N_2$ and hydrocarbon molecules, which are less absorbed. As air is made of around 80% of $N_2$ and 20% $O_2$, it is easy to understand that contamination during a bottle change can result in a sudden purifier failure.

Similarly, spontaneous air pollution will cause hot spot into the alloy and, in some cases, melting points that also generate detrimental chemical compounds. Moreover, air pollution can create an exothermal reaction, and thereby cause safety hazard.

Unless a separate analytical instrument is used to make sure that the gas purifier is working correctly and that external flow or/and pressure sensors are used, there is no way to make sure that the gas coming out of the purifier is below a certain level of impurities and that gas is properly being fed to the purifier.

In the semiconductor industries, where huge and expensive purifiers are used, the cost of an analytical instrument is not necessary an issue. This is not uncommon to find a gas chromatograph or mass spectrometer to monitor the gas outlet of the purifier.

However, in the laboratory-type gas purifier where the flow is low, generally less than 5 SLPM, and wherein the cost of such a purifier is generally below $2000, the use of a gas chromatograph or mass spectrometer to monitor the gas quality and external sensors is not financially justifiable.

However, the problem resulting from such gas purifier failure could be quite high. Indeed, in the case of a gas purifier failure the instrument has to be shut down, the gas chromatographic column has to be replaced or regenerated, and the detector have to be cleaned.

Furthermore, most of the time, the failure mode of the gas purifier is a slow decrease in its performance, which slowly impacts the purified gas quality over time. This slow decrease in performance in turn have an impact on the analytical instrument performance and may result in noise and drift and consequently a slow decrease of analytical instrument performance as well. This global slow decrease of the analytical instrument performance often remains undetected for a substantially long period of time, and sometimes results in poor process feedback and could potentially have an impact on the production quality.

Many laboratory gas purifiers are available on the market, but they all suffer from the same problem: their end of life cannot be predetermined with precision.

Some technologies rely on algorithms to estimate the end of life, but they are based on the principle that the gas purifier is only purifying a gas with a known amount of impurities, which means that those algorithms do not take into account the pollution during commissioning, bottle change over and sudden failure.

There is thus a need for a detector and related methods which alleviate or allow mitigating at least some of the problems presented above and seek to solve problems and drawbacks of the prior art.

SUMMARY

In accordance with one general aspect, there is provided a method for measuring a composition of a gas circulating through a plasma-based detector, the plasma-based detector having a discharge chamber defining an internal volume and having discharge electrodes configured to apply a plasma-generating field across the discharge chamber, the method including ramping a voltage applied across the discharge electrodes until the voltage reaches a breakdown voltage, thereby generating a plasma in the internal volume, the plasma emitting light, the light being indicative of a presence of the plasma; collecting the light emitted by the plasma to detect the presence of the plasma; determining a pressure in the internal volume of the discharge chamber based on the breakdown voltage upon detection of the presence of the plasma; operating the detector at an operation voltage, the operation voltage being greater than the breakdown voltage; performing at least one of an optical measurement and an electrical measurement on the plasma and generating a detector signal based thereon; and compensating the detector signal based on the pressure in the internal volume of the discharge chamber to obtain a compensated detector signal, the compensated detector signal being representative of the composition of the gas.

In some embodiments, the method includes producing a notification upon variations of the compensated detector signal.

In some embodiments, performing said at least one of the optical measurement and the electrical measurement includes electrically detecting and measuring an electrical current flowing through the plasma.

In some embodiments, the method includes obtaining an oscillating signal based on the electrical current.

In some embodiments, generating the detector signal includes processing the oscillating signal.

In some embodiments, the method includes monitoring the oscillating signal.

In some embodiments, monitoring the oscillating signal includes detecting a change in one or more properties of the oscillating signal.

In some embodiments, the method includes comparing said one or more properties of the oscillating signal with data provided in a database containing information about previously monitored oscillating signals.

In some embodiments, the method includes recording the breakdown voltage in a database containing information about previously recorded breakdown voltage.

In some embodiments, performing said at least one of the optical measurement and the electrical measurement includes optically detecting the light emitted by the plasma and measuring an optical emission of the plasma, the optical emission being spectrally representative of gas species present in the gas.

In some embodiments, the optical emission is a spectral line, the spectral line being representative of one of said gas species.

In some embodiments, optically detecting the light emitted by the plasma includes filtering a spectral component of the light.

In some embodiments, the method includes processing the compensated detector signal to obtain the composition of the gas.

In some embodiments, the method includes displaying the compensated detector signal.

In some embodiments, the voltage is supplied by a variable high voltage supply configured to generate a DC signal and wherein the voltage applied across the discharge electrodes remains constant once the plasma is generated.

In some embodiments, the voltage is supplied by a variable high voltage supply configured to generate an AC signal and wherein the voltage applied across the discharge electrodes is variable.

In some embodiments, determining the pressure includes calculating a pressure value based on the breakdown voltage using Paschen's law.

In some embodiments, compensating the detector signal based on the pressure in the internal volume of the discharge chamber to obtain the compensated detector signal is performed in real time.

In accordance with another general aspect, there is provided a plasma-based detector for measuring a composition of a gas circulating through the plasma-based detector, the plasma-based detector including: a discharge chamber defining an internal volume for receiving the gas therein; discharge electrodes configured for applying a plasma-generating field across the discharge chamber; a variable high voltage power supply operatively connected to the discharge electrodes, the variable high voltage power supply being configured to ramp a voltage applied across the discharge electrodes until the voltage reaches a breakdown voltage, thereby generating a plasma in the internal volume, the plasma emitting light, the light being indicative of a presence of the plasma; a light collector for collecting the light emitted by the plasma and detecting the presence of the plasma; a measurement circuit configured to perform at least one of an optical measurement and an electrical measurement on the plasma and generate a detector signal based thereon; and a processor configured for: determining a pressure in the internal volume of the discharge chamber based on the breakdown voltage upon detection of the presence of the plasma; and compensating the detector signal based on the pressure in the internal volume to obtain a compensated detector signal, the compensated detector signal being representative of the composition of the gas.

In some embodiments, the light sensor is a photodiode.

In some embodiments, the processor is further configured for producing a notification upon variations of the compensated detector signal.

In some embodiments, the measurement circuit is further configured for electrically detecting and measuring an electrical current flowing through the plasma.

In some embodiments, the measurement circuit is further configured for electrically obtaining an oscillating signal based on the electrical current.

In some embodiments, the measurement circuit is further configured for processing the oscillating signal.

In some embodiments, the detector includes a physical memory for recording the breakdown voltage thereon.

In some embodiments, the measurement circuit is further configured for optically detecting the light emitted by the plasma and measuring an optical emission of the plasma, the optical emission being spectrally representative of gas species present in the gas.

In some embodiments, the optical emission is a spectral line, the spectral line being representative of one of said gas species.

In some embodiments, the measurement circuit is further configured for filtering a spectral component of the light.

In some embodiments, the processor is further configured for processing the compensated detector signal to obtain the composition of the gas.

In some embodiments, the detector includes a display for displaying the compensated detector signal.

In some embodiments, the variable high voltage supply is configured to generate a DC signal and wherein the voltage applied across the discharge electrodes remains constant once the plasma is generated.

In some embodiments, the variable high voltage supply is configured to generate an AC signal and wherein the voltage applied across the discharge electrodes is variable.

In some embodiments, determining the pressure includes calculating a pressure value based on the breakdown voltage using Paschen's law.

In some embodiments, the processor is configured for compensating the detector signal based on the pressure in the internal volume of the discharge in real time.

In accordance with another general aspect, there are provided an electric discharge-based detector and methods using the electric discharge-based detector for measuring and monitoring properties of a gas flow. The electric discharge-based detector can notably perform gas purity measurement, pressure measurement and/or gas identification in real-time, based on the gas discharge breakdown voltage characteristics. The detector includes a discharge chamber.

The discharge chamber defines an internal volume. The discharge chamber is configured for receiving a gas or a gas flow therein. The detector includes a generator circuit. The generator circuit is configured for creating a plasma within the gas flow circulating through the discharge chamber. The generator circuit includes a variable high voltage power supply operatively connected to a discharge circuit and discharge electrodes, in order to generate an electrical field between the discharge electrodes. The detector includes a photodiode or any other light measurement device. At the breakdown voltage, the plasma emits light which can be detected by the photodiode of the other light measurement device. The photodiode or the other light measurement device detects the presence or absence of the plasma. The detector includes an optical circuit. The optical circuit is configured to convert the light (which is emitted by the plasma) received by the optical circuit to an electrical signal to be processed by a processor. The detector includes an electrical circuit for carrying out electrical measurements in the discharge chamber. The electrical circuit is configured to measure an electrical current that is flowing through the discharge chamber. Upon the generation of the plasma within the gas flow, the electrical current flows from one electrode to another one electrode of the electrodes, after a passage through the plasma generated within the gas flow. When the plasma is ignited within the discharge chamber, the discharge chamber and the electrodes form a closed circuit. The detector includes a processor. In some embodiments, the processor is a microprocessor coupled with a high-speed sampling circuit. The processor is configured for processing the electrical signal outputted by the optical circuit, hence generating a detector signal representative of the gas flow.

In some embodiments, the discharge chamber includes a gas inlet and a gas outlet for ensuring a passage of the gas flow within the internal volume.

In some embodiments, the discharge chamber has a substantially rectangular cross-section and have dimensions of 2 mm×5 mm×10 mm (height×width×depth).

In some embodiments, the internal volume of the discharge chamber is typically included in a range between 0.05 mL to 10 mL.

In some embodiments, the discharge chamber is provided with one of more windows allowing light emitted within the internal volume to be detected outside of the discharge chamber.

In some embodiments, the discharge electrodes are a pair of discharge electrodes extending within the internal volume of the discharge chamber.

In some embodiments, the discharge electrodes are in contact with the gas flow, such that at least a portion of the gas flow is submitted to the electrical field generated between the electrodes.

In some embodiments, the discharge electrodes are coated with a dielectric material.

In some embodiments, the dielectric material is quartz, mica or ceramic.

In some embodiments, the discharge electrodes include metallic electrodes inserted in a tube made of quartz.

In some embodiments, the discharge circuit includes a resistor and a capacitor in a parallel configuration. When the variable high voltage power supply is operated, the capacitor charges until a breakdown voltage is obtained, hence generating a plasma within the gas flow. At or beyond the breakdown voltage, the capacitor discharges, thereby generating an electrical current passing through the discharge chamber, from a first one to another one of the electrodes, through the plasma generated within the gas flow. Once discharged, the capacitor is charged again. As such, the charging/discharging of the capacitor define a charging cycle. The charging cycle is represented by an oscillating signal. The oscillating signal has a charging frequency, which can be monitored. A change in the charging frequency of the oscillating signal is representative of change in the gas flow.

In some embodiments, the electrical circuit is a spark gap oscillator.

In some embodiments, the electrical current is monitored to measure the quality of the gas.

In some embodiments, the measurements carried out with the electrical circuits could either be used alone, or in combination with the optical measurement circuit.

In some embodiments, the detector is configured to measure two voltage values, noted as a couple $(V_1, V_2)$. The value $V_1$ is the breakdown voltage value (for a given gas or gas composition at a predetermined pressure), and the value $V_2$ is the extinction voltage value (for a given gas or gas composition at a predetermined pressure), i.e. the voltage value at which the plasma does not longer emit light. The couple $(V_1, V_2)$ is representative of information about the gas composition, the level of impurity within the gas, and/or the pressure.

In some embodiments, the variable high voltage power supply is operated (i.e., "driven") in a DC operation mode. A voltage value is ramped, and then applied to the discharge electrodes, via the discharge circuit. The voltage value varies (increases or decreases) across the resistor when the voltage value is ramped by the high voltage power supply. The voltage value across the discharge electrodes increases until the breakdown voltage is reached but remains substantially constant across the discharges electrodes when the plasma is ignited (at or above the breakdown voltage). When the voltage value of the high voltage power supply reaches the breakdown voltage, the impedance decreases, resulting in an increase in the current flowing through the discharge electrodes, thereby allowing the voltage value to remain substantially constant across the discharge electrodes.

In some embodiments, the variable high voltage power supply is operated (i.e., "driven") in an AC operation mode. The variable high voltage power supply is operated such that the peak-to-peak amplitude of the AC signal (i.e., the envelope of the AC signal) is ramped. The voltage value varies across the resistor when the voltage value is ramped by the high voltage power supply. The voltage value across the discharges electrodes is variable when the plasma is ignited.

In some embodiments, the processor is coupled with a storage device. The storage device can be provided with onboard feedback algorithm(s).

In some embodiments, the storage device includes a pressure compensation algorithm and/or a gas identification algorithm. These algorithms take as an input the calculated pressure, and following appropriate operation(s), transformation(s) and/or data processing step(s), mitigate or cancel the effect of a pressure variation within the gas flow. The operation(s), transformation(s) and data processing step(s) are based on parameters which have been predetermined during the design validation of the detector.

In some embodiments, the processor is configured to display and monitor the detector signal. Upon detection of a variation of the detector signal, the processor is configured for producing a notification representative of a state of a purifier or a piece of equipment to which is coupled the detector.

In some embodiments, the detector is used for detecting the end of life of a purifier.

In some embodiments, the detector can be provided as a kit. The kit includes tubes for gas inlet/outlet and valves and for controlling the gas flow.

In accordance with another general aspect, there are provided methods for using an electric discharge-based detector.

In some embodiments, the methods allow performing a measurement sequence including three general steps. A first general step includes detecting the breakdown voltage of the gas flow within the discharge chamber, the second general step includes measuring the properties under investigation, and the third general step consists in a pause, also referred to as a "delay" between two subsequent measurement sequences. Each one of these three general steps can be separated into one or more substeps, including performing optical measurements(s) and/or electrical measurements.

In some embodiments, the optical measurements include the steps of providing a detector, circulating a gas flow through the detector, ramping a voltage value of a high voltage power supply operatively connected to discharge electrodes extending within an internal volume of a discharge chamber of the detector, thereby applying a field across the discharge electrodes, and detecting a presence of a plasma with a photodiode. If the photodiode detects the presence of the plasma, stopping ramping the voltage value and recording the voltage value as a breakdown value. If the photodiode does not detect the presence of the plasma, continue ramping the voltage value. The method also includes steps of operating the high voltage power supply at a voltage greater than the breakdown voltage, detecting the light emitted by the plasma with an optical circuit, the optical circuit being configured to convert the light detected by the optical circuit to an electrical signal, processing the electrical signal to obtain a detector signal, displaying and monitoring the detector signal, and producing a notification upon a variation of the detector signal.

In some embodiments, the electrical measurements include the steps of providing a detector, circulating a gas flow through the detector, ramping a voltage value of a high voltage power supply operatively connected to discharge electrodes extending within an internal volume of a discharge chamber of the detector, thereby applying a field across the discharge electrodes, and detecting a presence of a plasma with a photodiode. If the photodiode detects the presence of the plasma, stopping ramping the voltage value and recording the voltage value as a breakdown value. If the photodiode does not detect the presence of the plasma, continue ramping the voltage value. The method also includes steps of operating the high voltage power supply at a voltage greater than the breakdown voltage, providing an electrical circuit configured for generating an oscillating signal, monitoring the oscillating signal, processing the oscillating signal to obtain a detector signal, displaying and monitoring the detector signal, and producing a notification upon a variation of the detector signal.

In some embodiments, the high voltage supply is configured to generate a DC signal. Once the breakdown voltage is identified and recorded, the high voltage power supply is operated at the maximum voltage (i.e., a voltage value greater than the breakdown voltage), to avoid quenching of the plasma. The voltage value across the discharges electrodes is not variable once the plasma is ignited. If the current increases, the impedance decreases (or vice-versa), and so the voltage value remains substantially constant across the discharge electrodes.

In some embodiments, the variable high voltage supply is configured to generate an AC signal. The voltage value across the discharge electrodes is variable once the plasma is ignited. If the current is increased, the voltage value (across the discharge electrodes) increases as well. A small background current can be detected, even in the absence of a plasma within the discharge chamber.

In some embodiments, the background current is a capacitive current.

In some embodiments, the frequency of the AC signal ranges from about 10 kHz to about 100 kHz.

In some embodiments, the detector includes transformers having a ferrite core.

In some embodiments, a RF generator is operatively connected with the discharge electrodes.

In accordance with another general aspect, a method for operating the detector is also provided. In some embodiments, the detector is coupled with a gas purifier and the detector is configured for monitoring the end of life of the purifier. In other embodiments, the detector is used during commissioning of a gas purifier. In yet other embodiments, the detector is used to monitor the gas quality at the output of a gas purifier by monitoring the gas flow that is flowing through the detector. In other embodiments, the detector is provided as a kit including valves and is used conjointly with a gas purifier to periodically monitor the purifier inlet pressure and provide a diagnostic of the gas purifier. In yet other embodiments, the detector is operated to prevent catastrophic failure of a gas purifier by detecting an abnormal presence of a predetermined gas within the purifier and by producing a notification warning or turning off the gas purifier is the abnormal presence of the predetermined gas is detected.

Other features and aspects of the invention will be better understood upon reading of embodiments thereof with reference to the appended drawings.

DETAILED DESCRIPTION

Figures 1A, 1B:
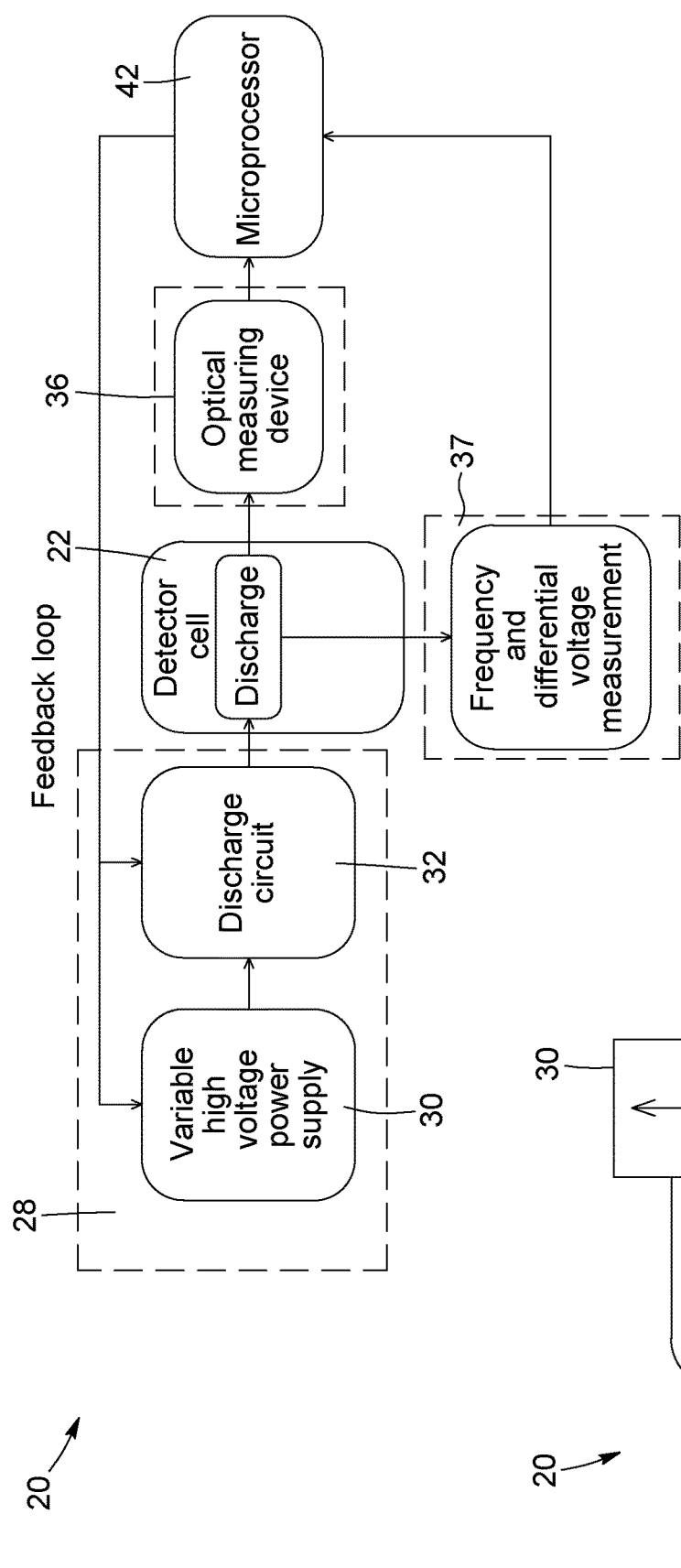
FIGS. 1A-B respectively illustrate a block diagram and a schema of a plasma-based detector.

In the following description, similar features in the drawings have been given similar reference numerals, and, to not unduly encumber the figures, some elements may not be indicated on some figures if they were already identified in one or more preceding figures. It should also be understood herein that the elements of the drawings are not necessarily depicted to scale, since emphasis is placed upon clearly illustrating the elements and structures of the present embodiments.

The terms "a", "an" and "one" are defined herein to mean "at least one", that is, these terms do not exclude a plural number of elements, unless stated otherwise. It should also be noted that terms such as "substantially", "generally" and "about", that modify a value, condition or characteristic of a feature of an exemplary embodiment, should be understood to mean that the value, condition or characteristic is defined within tolerances that are acceptable for the proper operation of this exemplary embodiment for its intended application.

Broadly described, embodiments described herein below relates to a plasma-based detector (sometimes referred to an electric discharge-based detector) and related methods using the plasma-based detector for measuring and monitoring properties of a gas flow, and more particularly the composition of a gas flow. The plasma-based detector, which could sometimes be referred to as a "Pulse Discharge Optical Feedback Detector" (PDOFD), will be referred to as the "detector" in the current description.

The detector is generally a plasma-based detector and can notably perform gas purity measurement, pressure measurement and/or gas identification in real-time or near real-time, based on the gas discharge breakdown voltage characteristics, as it will be explained in greater detail below.

Plasma-Based Detector

Generally described, various embodiments of the detector which will be described in the following section relate to an apparatus for detecting, measuring and/or monitoring some properties of a gas flow traversing the detector. It will be readily understood that the properties of the gas flow can encompass a variety of measurable features of the gas flow, such as, and without being limitative, impurity level, presence of contamination, pressure, change in pressure, breakdown voltage, and the like. In some embodiments, some of the properties of the gas flow can directly or indirectly be inferred from the optical and/or electrical properties of a plasma generated in the gas flow, as it will be made clear in the following description.

The detector can be used in a broad variety of application, such as, for example and without being limitative, measuring the composition of a gas, but also monitoring and identifying the end of life of a gas purifier, as it will be explained below.

Referring to FIGS. 1A-B there are shown schematic representations of a detector 20.

The detector 20 includes a discharge chamber 22. The discharge chamber 22, which can also be referred to as a "cell", defines an internal volume 24. The discharge chamber 22 is configured for receiving a gas or a gas flow therein.

The discharge chamber 22 includes a gas inlet and a gas outlet for ensuring a passage of the gas flow within the internal volume 24. As such, the gas flow can be injected through the gas inlet, then can circulate (i.e., traverse the internal volume 24), and then can be ejected from the internal volume 24 through the gas outlet.

In some embodiments, the discharge chamber 22 of the detector 20 can withstand pressure in a range comprised between ambient pressure and up to 500 PSIG. It will be readily understood by one skilled in the art that the unit "PSIG" refers to "pounds per square inch gauge" and entails that the gauge pressure is measured relative to ambient atmospheric pressure. While the detector 20 can be operated within the pressure range identified above, it is to be noted that the detector 20 could alternatively withstand lower and/or higher pressure.

The discharge chamber 22 can have a substantially rectangular cross-section and have, in some embodiments, dimensions of the order of 2 mm×5 mm×10 mm (height× width×depth). It will however be understood that the geometrical configuration, as well as the dimensions of the discharge 22 could vary, and that the discharge chamber 22 can be embodied by any structure or components assembled together defining a spaced defining an internal volume 24 through which can be circulated the gas flow.

The internal volume 24 of the discharge chamber 22 is typically comprised in a range between about 0.05 mL to 10 mL. The internal volume 24 of the discharge chamber 22 may vary from one application to another, and may, for instance, be dictated by the properties of the gas flow, such as: the volumetric flow rate of the gas flow through at the gas inlet, the reactivity of the gas component(s), and temperature.

The discharge chamber 22 may be provided with one of more windows 40 allowing light emitted within the internal volume 24 to be detected outside of the discharge chamber 22, as will be explained further below.

As it has been previously mentioned, the discharge chamber 22 can be in fluid communication with another device or apparatus, i.e., another piece of equipment, such as and without being limitative, the gas purifier (sometimes referred to as "a purifier getter"). In such embodiments, the pressure and the composition of the gas flow in the discharge chamber 22 is approximately the same as the ones in the other device or apparatus (e.g., the purifier getter).

The volumetric flow rate of the gas flow circulating through the detector can be low or high, depending on the targeted applications, and could be, for example less than 5 SLPM. In some embodiments, the flow rate is less than 1 mL/min.

The composition of the gas flow may also vary on the application at hand, but it is to be noted that the gas flow can include noble gas (e.g., helium, argon, neon, krypton, xenon or a mixture thereof) and/or gas impurities (e.g., $H_2$, $O_2$, $N_2$, $CH_4$, $CO$, $CO_2$, $H_2O$, non-methane hydrocarbons, and other gas impurity typically encountered in the context of bulk gas manufacturing and having an impact on gas chromatography). By way of example, in the context of the monitoring of a gas purifier, the gas flow may include a purified gas species, such as argon, and the detector may be configured to monitor impurity gas species which may be indicative of a potential issue to resolve in the gas purifier.

The detector 20 includes a generator circuit 28 (which could also be referred to a "modulation circuit"). The generator circuit 28 is configured for creating a plasma within the gas flow circulating through the discharge chamber 22.

In some embodiments, the generator circuit 28 includes a variable high voltage power supply 30 operatively connected to a discharge circuit 32 and discharge electrodes 34, in order to generate an electrical field between the discharge electrodes 34. The variable high voltage power supply 30 can provide a variable DC signal, a variable AC signal or a combination of a DC signal and an AC signal. The variable high voltage power supply us configured to ramp a voltage applied across the discharge electrodes until the voltage reaches a breakdown voltage, thereby generating a plasma in the internal volume, the plasma emitting light, the light being indicative of a presence of the plasma. In some embodiments, the expression "ramp" includes "ramping up", which means that the value of the applied voltage is increased from a starting voltage value to a second voltage value, the second voltage value being greater than the starting voltage value.

In some embodiments involving a DC signal, the variable high voltage power supply 30 can be operated (i.e., "driven") such that a voltage value is ramped, and then applied to the discharge electrodes 34, via the discharge circuit 32. Now turning to FIG. 1C, it is to be noted that the voltage value can vary across the resistor 33 when the voltage value is ramped by the high voltage power supply 30 but remains substantially constant across the discharges electrodes 34 when the plasma is ignited. Indeed, when the voltage value of the high voltage power supply 30 reaches the breakdown voltage (hence generating a plasma within the chamber 22), the impedance decreases, resulting in an increase in the current flowing through the discharge electrodes 34, which allows the voltage value to remain substantially constant across the discharge electrodes 34.

In some embodiments involving an AC signal, the variable high voltage power supply 30 can be operated such that the peak-to-peak amplitude of the AC signal (i.e., the envelope of the AC signal) is ramped or modulated (i.e., increased or decreased). As such, the voltage value can vary across the resistor 33 when the voltage value is ramped by the high voltage power supply 30. However, the voltage value across the discharges electrodes 34 can still vary when the plasma is ignited, contrary to the DC operation mode. An example of a detector operable with an AC signal is illustrated in FIG. 1G. It is to be noted that in the AC operation mode, i.e., when the discharge electrodes 34 are coated with a dielectric material, the resistor 33 is optional.

In some embodiments, the frequency of the AC signal ranges from about 10 kHz to about 100 kHz. This range of frequencies is compatible with transformers having a ferrite core and/or small dimensions. In one implementation, a RF generator could be operatively connected with the discharge electrodes.

Turning back to FIGS. 1A-G, the discharge electrodes 34 are typically embodied by a pair of discharge electrodes extending within the internal volume 24 of the discharge chamber 22.

In one embodiment, the discharge electrodes 34 are in contact with the gas flow, such that at least a portion of the gas flow is submitted to the electrical field generated between the electrodes. This embodiment is compatible with the DC operation mode. In another embodiment, the discharge electrodes 34 are not in direct contact with the gas flow but are rather put in contact with the external surface of the discharge chamber, for example made of a dielectric material such as quartz, thereby defining a Dielectric Barrier Discharge (DBD) configuration.

In one embodiment, the discharge electrodes 34 can be coated with a dielectric material in order to improve their life time, and provide a DBD plasma. The dielectric material can be, for example and without being limitative, quartz, mica, ceramic or the like. In one implementation, the discharge electrodes 34 include metallic electrodes inserted in a tube made of quartz. Such implementations of the discharge electrodes 34 can be used when the high voltage power supply 30 is operated to generate an AC signal, i.e., the AC operation mode. In this context, the metallic electrodes are not in direct contact with the gas. In some embodiments, the discharge electrodes 34 are parallel one relative to another.

The discharge circuit 32 can include various electrical components controlling and/or stabilizing the voltage to be applied to the discharge electrodes 34. Such electrical components can include, for example and without being limitative, other electrical circuits, batteries, resistors, inductors, capacitors, switches, current, voltage sources, amplifier, rectifier, or any other elements identified as being appropriate by one skilled in the art.

In operation, the voltage value of the high voltage power supply 30 is ramped, thereby applying a field across the discharge electrodes 34. When the voltage value reaches the breakdown voltage of the gas, a plasma is generated in the gas flow, for example between and/or adjacent, i.e., in a region near the discharge electrodes 34. The generated plasma emits light, which can be in turn detected by appropriate devices, apparatuses or instruments. As well known in the art, both the breakdown voltage and the spectral properties of the light emitted by the plasma are related to the composition of the gas flow.

Figure 1C:
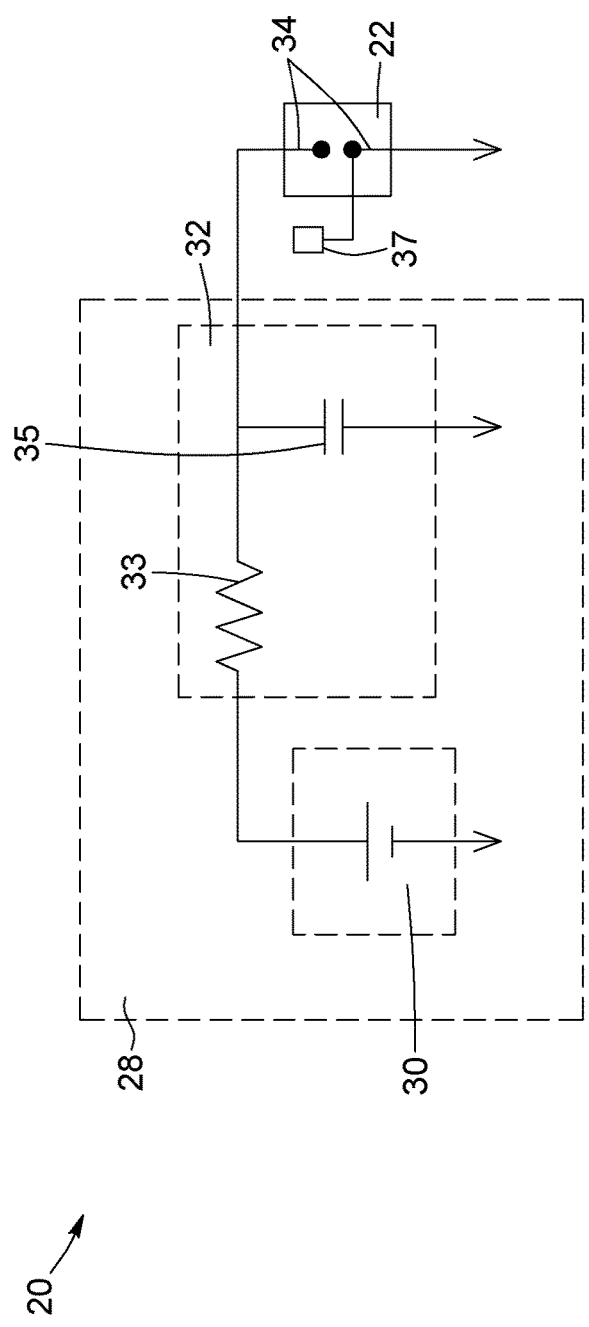
FIGS. 1C-F illustrate various embodiments of a generator circuit and an electrical circuit.

In one embodiment, such as the one depicted in FIG. 1C, the discharge circuit 32 includes a resistor 33 and a capacitor 35. The resistor 33 and the capacitor 35 are in a parallel configuration. The resistor 33 can be useful, for example, for limiting an electrical current or current variation in the discharge chamber 22. When the variable high voltage power supply 30 is operated, the capacitor 35 charges until the voltage breakdown is obtained. At or beyond the breakdown voltage, the capacitor 35 discharges, thereby generating an electrical current passing through the discharge chamber 22 (i.e. from a first one to another one of the electrodes 34, through the plasma generated within the gas flow 26). Once discharged, the capacitor 35 can be charged again. As such, the charging/discharging of the capacitor 35 define a "charging cycle", which can be represented by an oscillating signal. The charging signal has a charging frequency, which can be monitored. A change in the charging frequency of the oscillating signal is representative of change in the gas flow 26, e.g., a change in gas purity. Indeed, because the breakdown voltage is dependent on the gas purity, the frequency of the oscillating signal is also affected by a change in composition of the gas passing through the discharge chamber 22. This configuration of the generator circuit 32 can be used during the optical measurements and/or the electrical measurements, as it will be explained in greater detail below. Generally, this configuration is compatible with frequency-dependent measurements.

Figure 1D:
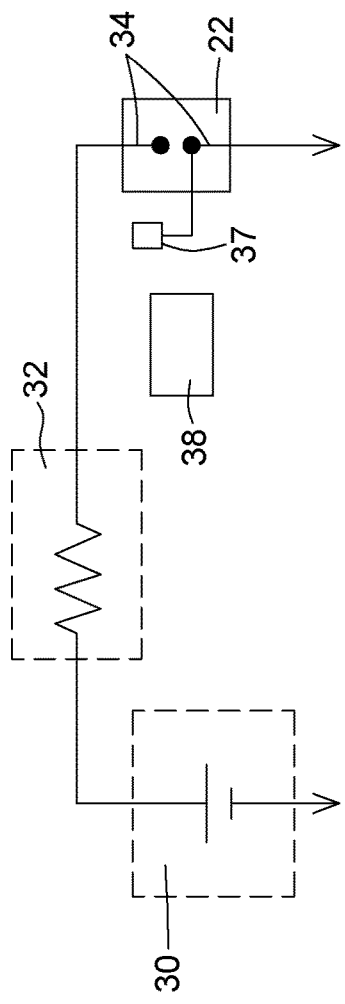
Figure 1E:
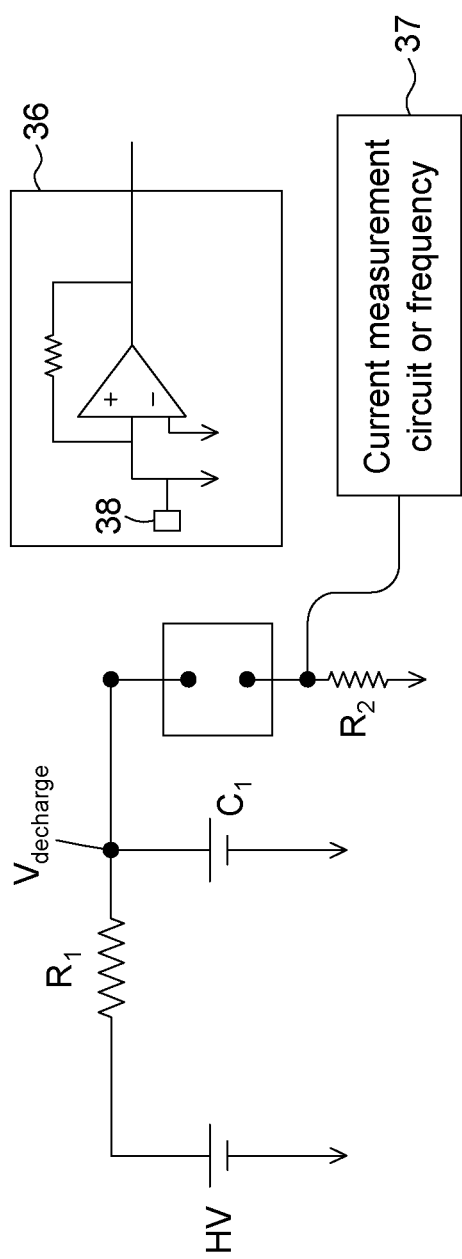
Figure 1F:
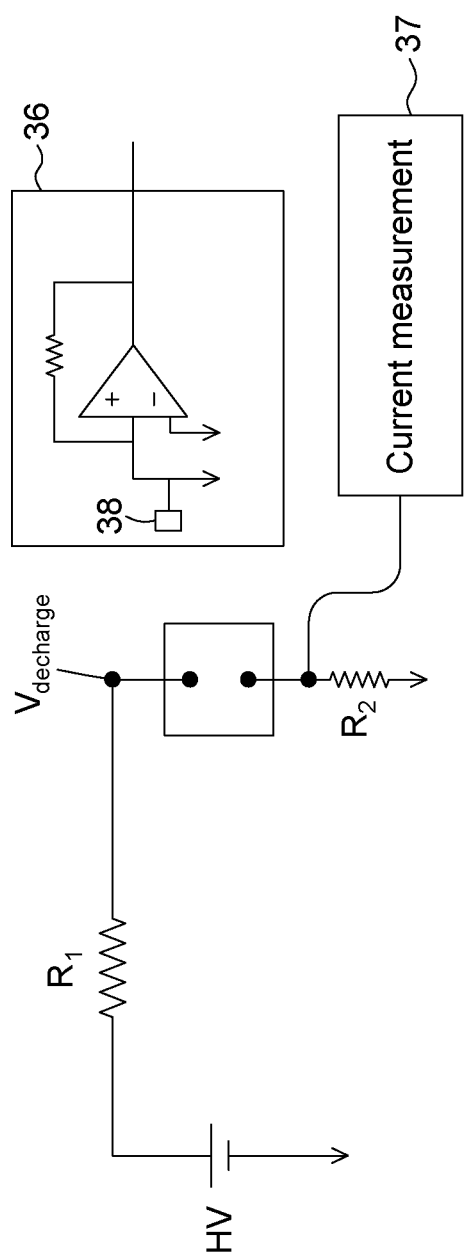
Figure 1G:
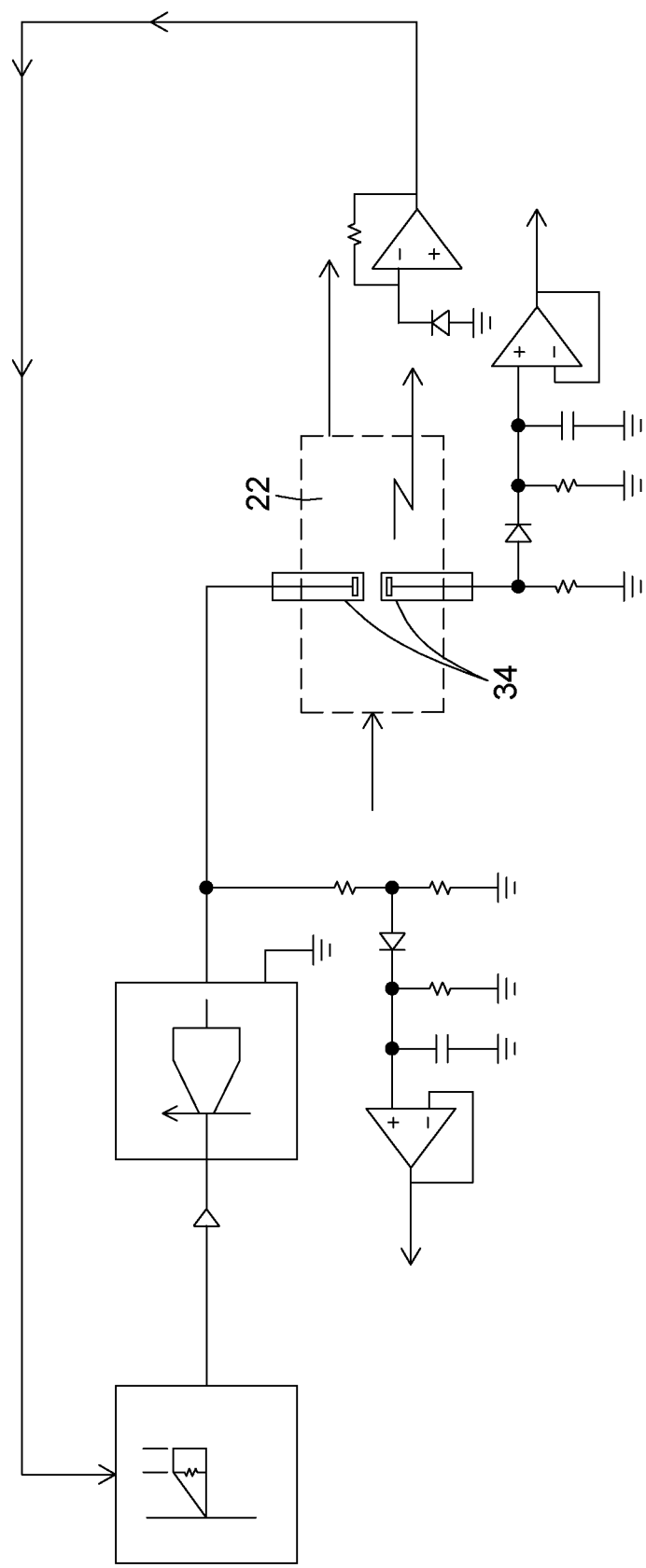
FIG. 1G illustrates an electrical circuit representative of a plasma-based detector, in accordance with one embodiment.

Now turning to FIG. 1D, an embodiment of the generator circuit 32 is illustrated. In this embodiment, the generator circuit 32 includes a resistor placed upstream of the discharge chamber 22, for example for limiting the current or current variation passing through the electrodes 34. This configuration of the generator circuit 32 can be used during the optical measurements and some of the electrical measurements, as it will be explained in greater detail below. Generally, this configuration is not compatible with frequency-dependent measurements.

Turning back to FIGS. 1 and 2, in some embodiments, the current at the output of the discharge circuit 32 is a direct current. Alternatively, the current could be an AC current.

In several embodiments, the detector 20 includes a light collector for collecting the light emitted by the plasma and detecting the presence of the plasma.

In some embodiments the light collector is a photodiode 38 or any other light measurement device. The photodiode 38 allows converting the received light to an electrical signal. Hence, the photodiode 38 can detect the presence or absence of a plasma. In some embodiments, the detector 20 includes a plurality of photodiodes 38. In some scenarios, the photodiode(s) can be mounted near or on the discharge chamber 22, near the window(s) provided in the discharge chamber. As such, the light emitted by the plasma is transmitted through the window(s) and reaches the photodiode 38, thereby confirming that the plasma has been generated. On the contrary, when the plasma is not generated, the photodiode 38 does not generate an electrical signal, which acts as an indicator that the plasma has not yet been generated in the discharge chamber 22. Simply put, the photodiode 38 is a simple "go/no-go" measurement and its result is an indication that the plasma has been generated or not.

The detector 20 also includes a measurement circuit. The measurement circuit is configured to perform at least one of an optical measurement and an electrical measurement on the plasma and generate a detector signal based thereon. As such, the measurement circuit generally includes an optical circuit 36 and an electrical circuit 37. These two circuits could either be used alone or in combination but in any cases will be individually described for clarity purpose.

The optical circuit 36 is configured to convert the light (which is emitted by the plasma) received by the optical circuit 36 to the detector signal to be processed by a processor, as it will be described in greater detail below. It is to be noted that even if the optical circuit 36 performs an optical measurement, the produced detector signal is an electrical signal. In the optical measurement configuration, the measurement circuit is configured for optically detecting the light emitted by the plasma and measuring an optical emission of the plasma, the optical emission being spectrally representative of gas species present in the gas. In some embodiments, the optical emission is a spectral line, the spectral line being representative of one of the gas species. In some embodiments, wherein the measurement circuit is further configured for filtering a spectral component of the light.

In some embodiments, the optical circuit 36 includes filter(s), narrow interference filter(s), broad bandpass filter(s), optical sensor(s) including multiple bandpass filters, lenses, optical fibers and/or other optical components collecting, guiding, transforming, or otherwise affecting light.

In some scenarios, the photodiode(s) 38 which have been previously described for the detecting the presence or absence of the plasma within the discharge chamber 22, could be part of the optical circuit 36.

As better seen in FIGS. 1C-D, the detector 20 also includes an electrical circuit 37 for carrying out electrical measurements in the discharge chamber 22 and producing the detector signal. As such, the measurement circuit can be configured for electrically detecting and measuring an electrical current flowing through the plasma.

The electrical circuit 37 is configured to measure an electrical current that is flowing through the discharge chamber 22. As seen in FIGS. 1C-D, the electrical circuit 37 is in series with the discharge chamber 22. Upon the generation of the plasma within the gas flow 26, the electrical current flows from one electrode to another one electrode of the electrodes 34, after a passage through the plasma generated within the gas flow 26. As such, when a plasma is ignited within the discharge chamber 22, the discharge chamber 22 and the electrodes 34 form a closed circuit.

Alternatively, when there is no plasma within the discharge chamber 22, the discharge chamber 22 and the electrodes 34 form an open circuit, and no current is measured at the output of the discharge chamber 22 and/or through the discharge electrodes 34. It is to be noted that when the variable high voltage power supply 30 is configured and operated to provide an AC signal, a small background current (i.e., a non-null current) can be measured between the discharge electrodes 34, even in the absence of a plasma. This small background current can also be an alternating current. Alternatively, when the variable high voltage power supply 30 is configured and operated to provide a DC signal, no current can be measured between the discharge electrodes 34 in the absence of a plasma.

In some embodiments, such as the one depicted in FIG. 1C, the discharge circuits 32 is referred to as an "oscillating circuit" or a "self-oscillating circuit". In such embodiments, the generator circuit 28 is in combination with the discharge chamber 22 and the discharge electrodes 34, which all together form the oscillating circuit. This type of circuit is known in the art as a "spark gap oscillator". The oscillating circuit is then said to generate the oscillating signal. As such, the electrical current described above (i.e., flowing from one electrode to another) can sometimes be referred as the "oscillating signal". The oscillating signal can be, in some embodiments, the charging cycle of a capacitor provided in the generator circuit 28, as it has been previously described.

The electrical circuit 37 is typically in series with the discharge electrodes 34 (see for example FIG. 1C).

In one embodiment, the electrical current is monitored to measure the quality of the gas (i.e., determining the impurity level in the gas). Indeed, as the electrical current is influenced by the gas composition, the abovementioned measurements can be used to detect the presence of impurity (or a change in pressure) in the gas flow 26. It is to be noted that the measurements carried out with the electrical circuits could either be used alone, or in combination with the optical measurement circuit. Alternatively, the electrical measurements could be used in the context of a "go/no go" application, for example for detecting severe pollution in a purifier.

In one implementation, the discharge chamber 22 is part of the self-oscillating circuit, as it has been described above. In such an implementation, the high voltage provided by the variable high voltage power supply 30 is maintained above the breakdown voltage. The frequency of the electrical current generated in the presence of the plasma (i.e., in the discharge chamber 22, between the electrodes 34), which is gas composition-dependant, could then be monitored, similarly to what has been previously described.

It is to be noted that the period, amplitude and other relevant parameters of the electrical signal can vary upon a change in composition or in pressure of the gas flow, and so could be monitored by the electrical circuit 37. It will be readily understood that the conception and configuration of the electrical circuit 37 could be adapted, depending on the targeted application.

The electrical measurement circuit 37 includes electronics components to ensure an appropriate functioning of the same, and such components include, but are not limited to: resistors, switches, amplifiers, filters, and any other components already known by one skilled in the art.

In some embodiments, the measurement circuit is configured for electrically obtaining the oscillating signal based on the electrical current generated by the electrical measurement and the measurement circuit is further configured for processing the oscillating signal.

In some embodiments, the detector 20 includes a physical memory for recording the breakdown voltage thereon.

In one embodiment, the detector 20 is configured to measure two voltage values, e.g., noted as a couple $(V_1, V_2)$. In such an embodiment, the value $V_1$ is the breakdown voltage value (for a given gas or gas composition at a predetermined pressure), and the value $V_2$ is the extinction voltage value (for a given gas or gas composition at a predetermined pressure), i.e., the voltage value at which the plasma does not longer emit light. The couple $(V_1, V_2)$ can provide, for example and without being limitative, information about the gas composition, the level of impurity within the gas, and/or the pressure. In the context in which the detector 20 is used to monitor one predetermined property of the gas flow 26, the couple $(V_1, V_2)$ can provide additional information about other one(s) of the property of the gas.

It is to be noted that each one of the voltage values forming the couple $(V_1, V_2)$ can be measured under the same conditions. For example, if $V_1$ is measured at a pressure p, then $V_2$ is measured at the same pressure p.

In some scenarios, the frequency (or frequency variation) of the oscillating signal is monitored, and the couple $(V_1, V_2)$ provides additional information on the breakdown voltage and the extinction voltage values. As such, the detector 20 can allow obtaining a more complete profile of the gas or the gas composition, i.e., the information extracted from the oscillating signal frequency (or frequency variation), combined with the breakdown voltage and the extinction voltage values can offer a more complete characterization of the gas or the gas composition.

Depending on the configuration of the generator circuit 28, the measurements can be carried out through different steps. In one example, the variable high voltage power supply 30 is manually operated by a user. In this example, the voltage value is continuously ramped until the breakdown voltage is attained, and the breakdown voltage value is noted or saved by the user. Then, the voltage value is ramped down, and the extinction voltage value is noted or saved by the user. This two-step measurement can be carried with different gas including different level or type of impurity and/or at different pressure. An implementation of the detector 20 compatible with this approach is illustrated in FIG. 1D. In this implementation, the couple $(V_1, V_2)$ can be measured downstream the resistor, but upstream the discharge chamber 22. In another example, the voltage value could be automatically ramped. An implementation of the detector 20 compatible with this approach is illustrated in FIG. 1C. In this implementation, the couple $(V_1, V_2)$ can be measured at the capacitor (i.e. the breakdown voltage and the extinction voltage are the voltage values measured across the capacitor).

Still referring to FIG. 1, the detector 20 includes a processor 42. The processor 42 is configured for determining a pressure in the internal volume 24 of the discharge chamber 22 based on the breakdown voltage upon detection of the presence of the plasma. The processor 42 is also configured for compensating the detector signal based on the pressure in the internal volume to obtain a compensated detector signal, the compensated detector signal being representative of the composition of the gas. In some embodiments, the processor 42 is configured for processing the compensated detector signal to obtain the composition of the gas.

In some embodiments, the determination of the pressure comprises calculating a pressure value based on the breakdown voltage using Paschen's law.

In some embodiments, the processor 42 is configured for compensating the detector signal based on the pressure in the internal volume 24 of the discharge chamber 22 in real time.

In some embodiments, the processor is further configured for producing a notification upon variations of the compensated detector signal.

In some embodiments, the processor 42 is a microprocessor coupled with a high-speed sampling circuit. The processor 42 is configured for processing the electrical signal outputted by the optical circuit 36, hence generating a detector signal representative of the gas flow (e.g., the composition of the gas flow).

It will be readily understood that the processor 42 can be coupled with a storage device (e.g., a memory). The storage device can be provided with onboard feedback algorithm(s).

In one embodiment, the storage device includes a pressure compensation algorithm and/or a gas identification algorithm. These algorithms can take as an input the calculated pressure, and following appropriate operation(s), transformation(s) and/or data processing step(s), mitigate or cancel the effect of a pressure variation within the gas flow. The operation(s), transformation(s) and data processing step(s) can be based, for example and without being limitative, on parameters which have been predetermined (i.e., "obtained"), during the design validation of the detector 20.

The detector 20 can associated with or include a display configured to display and monitor the detector signal and/or the compensated detector signal. In this context "monitoring the detector signal" refers to keeping track of its variation in time, and may include periodically check if its general shape, for example its baseline, is changing over time. Other variations of interest could include, for example and without being limitative: baseline drift, presence of peak, or presence of noise in the detector signal Upon detection of a variation of the detector signal, the processor 42 can be further configured for producing a notification, which could be, for example, representative of a state of the purifier or the piece of equipment to which is coupled the detector. For example, if the baseline of the detector signal, which is typically constant over time, starts increasing or decreasing as a result of a change in the gas flow composition, the processor 42 could be configured so that a notification is sent to a user operating the detector, informing the user that there is a change in the gas flow composition.

Alternatively, the processor 42 could be configured for producing a warning signal. In the scenarios in which the detector 20 is coupled with another device, apparatus or instrument, the processor 42 could further be configured to control the other device, apparatus or instrument. As such, upon a variation of the detector signal, the processor 42 could, for example, automatically turn off the device, apparatus or instrument, in order to prevent damages to the piece of equipment to which the detector 20 is coupled.

Some of the abovementioned components and/or circuits can be integrated or grouped into a single device or system. For example, the optical circuit 36 and the processor 42 could form an integrated device. Similarly, the variable high voltage power supply 30 and the discharge circuit 32 (forming the generator circuit 28) could be integrated into a single system and could be electrically and mechanically connected through appropriates means and/or components.

Now that general embodiments of the detector 20 have been described, an exemplary implementation of the detector 20 will now be presented.

Implementation of a Purifier End of Life Detector

Figure 2:
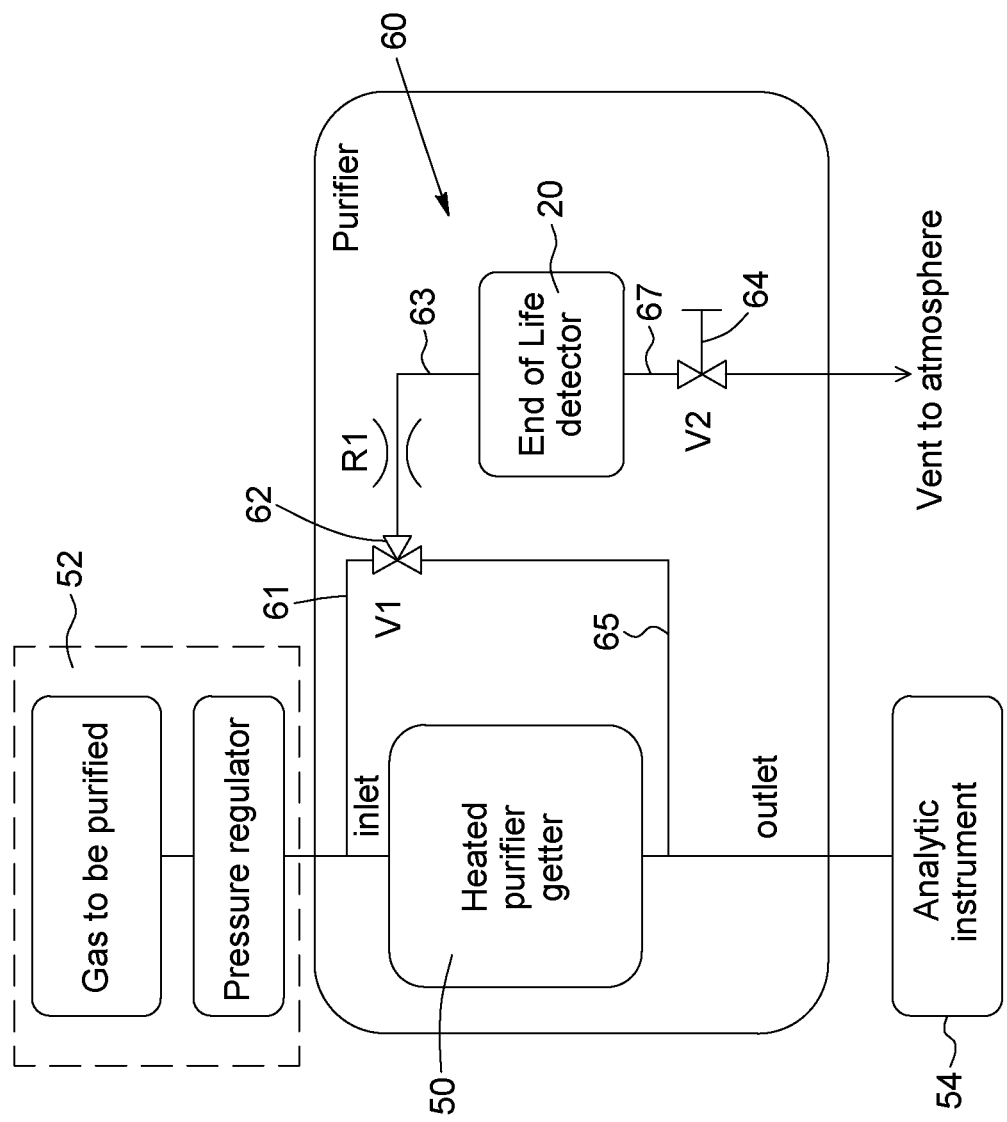
FIG. 2 illustrates a mode of operation of the plasma-based detector of FIG. 1, in which the plasma-based detector is used conjointly with a gas purifier in order to detect the end of life of the gas purifier.

In some scenarios, such as the one illustrated in FIG. 2, the detector 20 can be used for detecting the end of life of a purifier 50.

In such scenarios, the detector 20 can be provided as a kit. The kit includes tubes 61, 63, 65 and 67 for gas inlet/outlet and valves 62 and 64 for controlling the gas flow.

In these implementations, a gas source 52 is positioned upstream of the purifier 50 and the detector 20. The gas source 52 includes, in some embodiments, a gas tank operatively connected to a pressure regulator, which allows to provide the purifier 50 and the detector 20 with a controlled gas flow.

In such implementations, an analytical instrument 54 is placed downstream the purifier 50, which is fed with a purified gas flow after the passage of the gas flow through the purifier 50. Methods for operating the purifier end of life detector will be described in one of the next sections.

Method for Measuring and Monitoring Properties of a Gas Flow

Different methods can be performed using the detector described above. For example, the detector can be configured to perform optical and/or electrical measurements in order to measure and monitor properties of a gas flow. Some of the methods which will be described below are compatible with the different implementations of the detector previously described, for example and without being limitative: impurity detection and pressure detection. As it has been previously mentioned, the term "properties" refers to, in the context of the present description, for example and without being limitative, to pressure (or a change in pressure), impurity level and/or contamination within the gas flow circulating through the detector.

Generally described, there is provided a method for measuring a composition of a gas circulating through a plasma-based detector. As described above, the plasma-based detector has a discharge chamber defining an internal volume and has discharge electrodes configured to apply a plasma-generating field across the discharge chamber. The method includes ramping a voltage applied across the discharge electrodes until the voltage reaches a breakdown voltage, thereby generating a plasma in the internal volume. The plasma emits light and the light is indicative of a presence of the plasma. The method also includes collecting the light emitted by the plasma to detect the presence of the plasma, determining a pressure in the internal volume of the discharge chamber based on the breakdown voltage upon detection of the presence of the plasma, operating the detector at an operation voltage, the operation voltage being greater than the breakdown voltage, performing at least one of an optical measurement and an electrical measurement on the plasma and generating a detector signal based thereon and compensating the detector signal based on the pressure in the internal volume of the discharge chamber to obtain a compensated detector signal. As it has been previously described, the compensated detector signal is representative of the composition of the gas.

In some embodiments, the method includes producing a notification upon variations of the compensated detector signal.

In some embodiments, performing at least one of the optical measurement and the electrical measurement includes electrically detecting and measuring an electrical current flowing through the plasma. In such embodiments, the method includes obtaining an oscillating signal based on the electrical current and generating the detector signal includes processing the oscillating signal. The method can include a step of monitoring the oscillating signal. This monitoring step can include detecting a change in one or more properties of the oscillating signal.

In some embodiments, the method includes comparing the properties of the oscillating signal with data provided in a database containing information about previously monitored oscillating signals.

In some embodiments, the method includes recording the breakdown voltage in a database containing information about previously recorded breakdown voltage.

In some embodiments, performing at least one of the optical measurement and the electrical measurement includes optically detecting the light emitted by the plasma and measuring an optical emission of the plasma, the optical emission being spectrally representative of gas species present in the gas. The optical emission can be a spectral line. The spectral line is representative of one of said gas species. The method can include optically detecting the light emitted by the plasma comprises filtering a spectral component of the light. In some embodiments, the method includes processing the compensated detector signal to obtain the composition of the gas.

In some embodiments, the method includes displaying the compensated detector signal.

In some embodiments of the method, the voltage is supplied by a variable high voltage supply configured to generate a DC signal and the voltage applied across the discharge electrodes remains constant once the plasma is generated. In other embodiments, the voltage is supplied by a variable high voltage supply configured to generate an AC signal and the voltage applied across the discharge electrodes is variable.

The determination of the pressure comprises includes calculating a pressure value based on the breakdown voltage using Paschen's law.

In some embodiments, compensating the detector signal based on the pressure in the internal volume of the discharge chamber to obtain the compensated detector signal is performed in real time.

Example of Implementations

In accordance with one implementation, the methods allow performing a measurement sequence which can be separated into three general steps.

Figure 3:
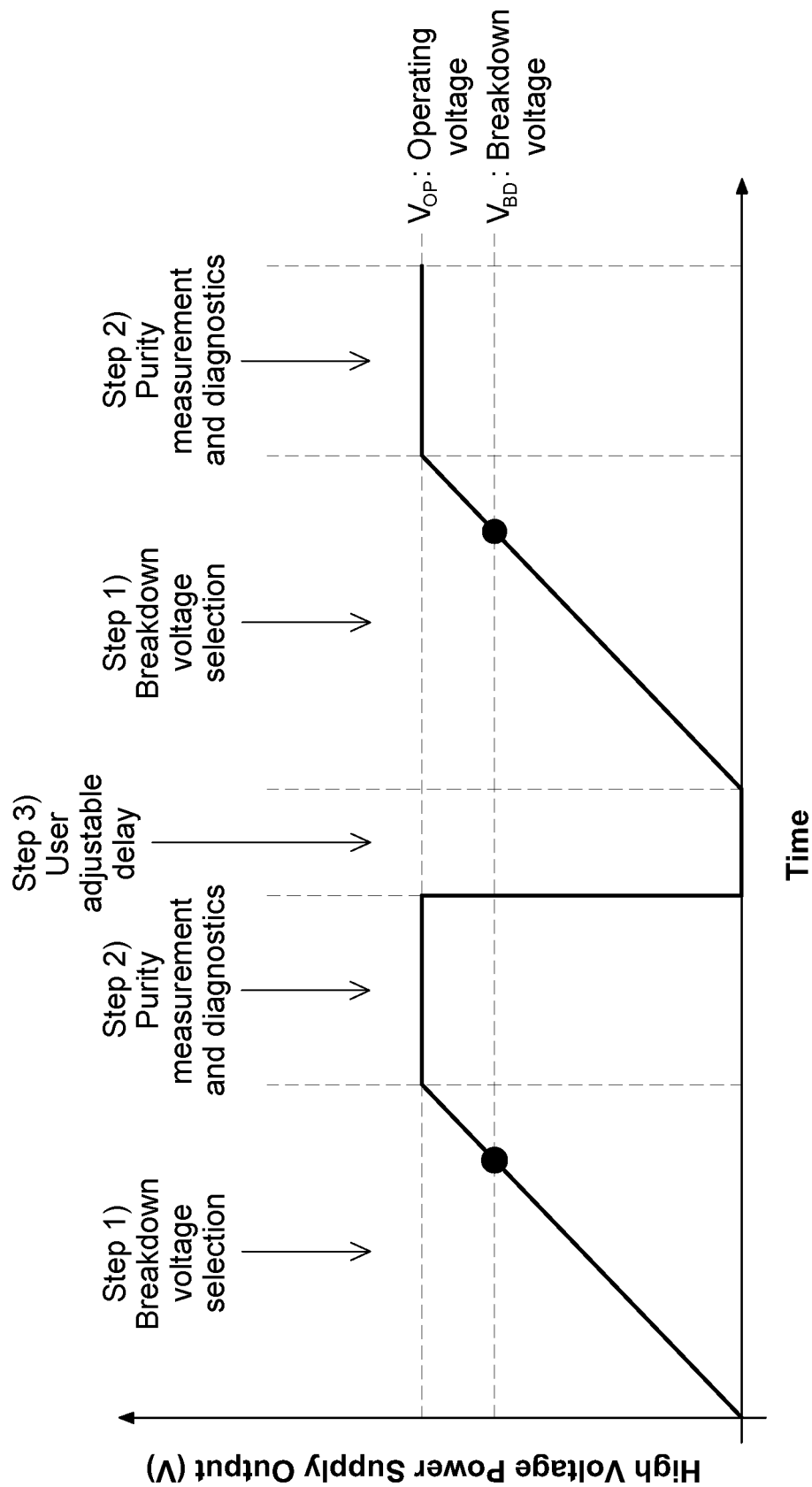
FIG. 3 shows the measurement sequence, according to one embodiment.

Turning to FIG. 3, the first general step includes detecting the breakdown voltage of the gas flow within the discharge chamber, the second general step includes measuring the properties under investigation (e.g., presence or absence of impurity, pressure change, or the like), and the third general step consists in a pause, also referred to as a "delay" between two subsequent measurement sequences. Each one of these three general steps can be separated into one or more substeps, which will be described in greater detail below. More particularly, some of these substeps can include performing optical measurements(s) and/or electrical measurements, as it will be described in the following sections. As it has been previously suggested, such optical and/or electrical measurement(s) can relate to the optical and electrical properties of a plasma generated in the gas flow, within the discharge chamber (e.g., near the discharge electrodes).

Figure 5:
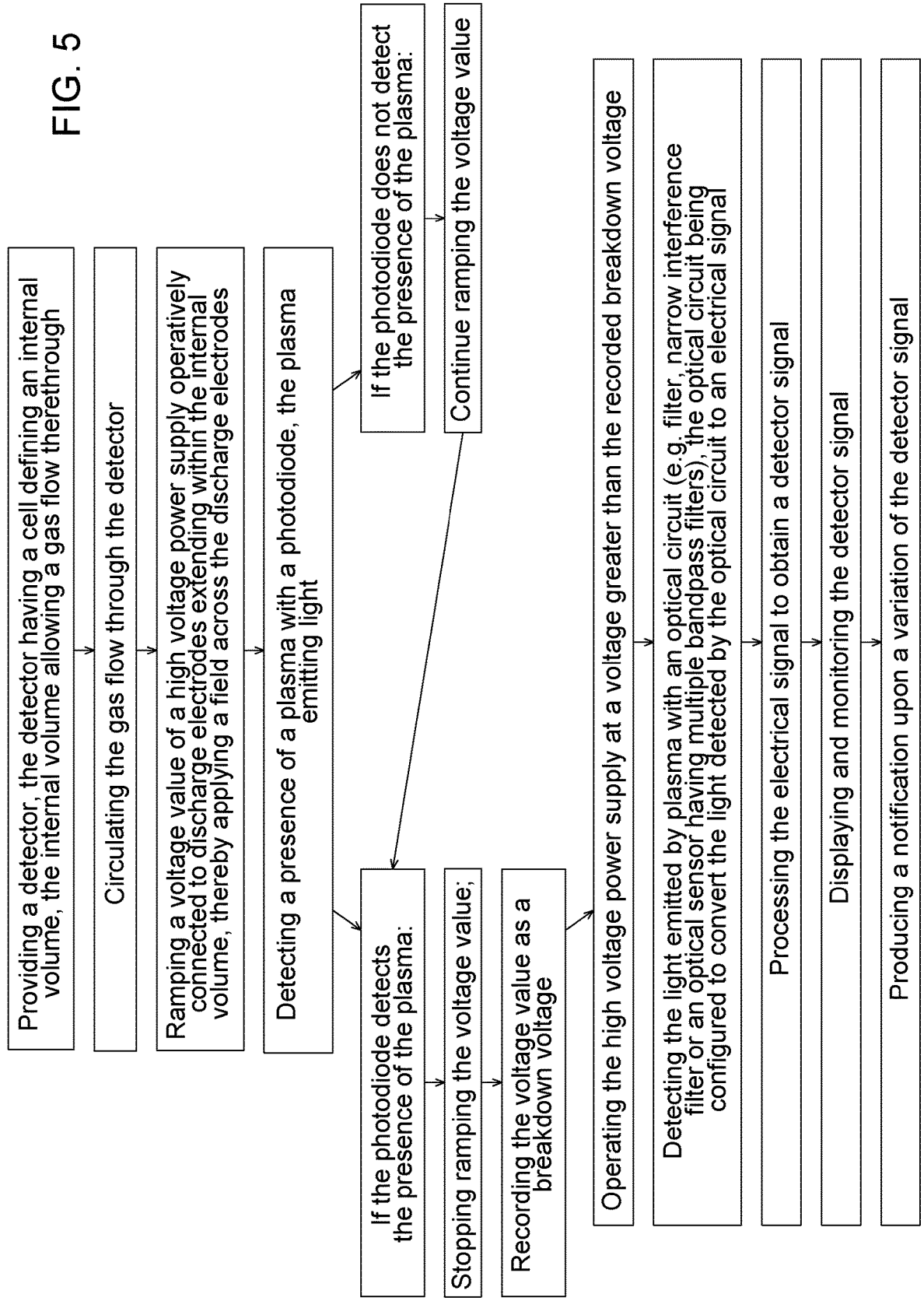
FIG. 5 is a flowchart of a method for measuring and monitoring properties of a gas flow traversing a plasma-based detector, according to one embodiment.

Further details on the optical measurements will now be provided, and different embodiments of a method for optically detecting and monitoring some properties of a gas flow will be described. Such a method will be simply referred to as "optical measurements" in the present section, and will, for most part, be described with reference to FIG. 5 which illustrates a flowchart of a method for measuring and monitoring properties of a gas flow traversing a plasma-based detector.

The optical measurements typically start with providing an plasma-based detector. As it has been previously described, the detector has a discharge chamber (which has also been referred to as a "cell"). The discharge chamber defines an internal volume, which allows a gas flow therethrough, or, alternatively to be filled with a gas. As such, the discharge chamber generally includes a gas inlet and a gas outlet for allowing the injection of the gas flow within the discharge chamber, and, subsequently, the ejection of the gas flow from the discharge chamber.

The next step includes circulating the gas flow through the detector so that the discharge chamber is traversed by the gas flow. In some implementations, the gas flow is continuously circulating through the detector, for example for continuous and real-time implementations. In other implementations, the gas flow follows a cycle (i.e., is "pulsed"), which means that a predetermined amount of gas can be injected within the discharge chamber, and then the flow of gas can be interrupted for a predetermined delay. Each cycle can be repeated one or several times.

The gas flow is typically injected into the discharge chamber through a gas inlet. After its passage through the detector, the gas flow is ejected from the discharge chamber through a gas outlet.

In some embodiments, the step of circulating the gas flow can include circulating a carrier gas comprising impurity. In other embodiments, the carrier gas can include, for example and without being limitative, air, argon, helium, neon, krypton or xenon.

As it has been previously described, the discharge electrodes can extend within the internal volume of the discharge chamber of the detector and are operatively connected to the variable high voltage power supply through a discharge circuit.

Once the gas flow is circulating through the discharge chamber, or, alternatively, when the discharge chamber is filled with the gas, a step of ramping a voltage value of the high voltage power supply is performed. The voltage value, as set by the variable high voltage power supply, is applied to the discharge electrodes through the discharge circuit, thereby applying an electrical field across the discharge electrodes.

Once the voltage value rises above a voltage threshold referred to as the breakdown voltage, then a plasma is generated within the gas flow, in a region near the discharge electrodes (e.g., between and/or adjacent the electrodes). If a plasma is generated, the step of ramping the voltage value is stopped, and the minimal voltage value at which the plasma is generated is recorded as the breakdown voltage. Alternatively, the step of ramping the voltage could be carried out even after the generation of the plasma, i.e., that the ramping (or, alternatively the "sweeping") of the voltage value may continue after the generation of the plasma.

The abovementioned step then includes detecting a presence of a plasma. Such a detecting step can be performed, for example and without being limitative, using a photodiode or any other device(s) allowing to convert light into an electrical current. More particularly, this detection is based on the fact than upon the application of the breakdown voltage to the gas flow at the discharge electrodes, a plasma is generated in the gas flow. As the plasma emits light, the photodiode can detect the light, which is an indication that a plasma is generated in the discharge chamber. An indication that a plasma has not been yet generated can therefore be deduced from the absence of current generated by the photodiode.

As it has been previously mentioned, if the photodiode detects the presence of the plasma, the step of ramping the voltage value is stopped, and the voltage value is recorded as being the breakdown voltage (i.e., the minimal voltage value at which the plasma is formed within the gas flow). As it has been noted, the step of ramping the voltage value continues otherwise (i.e., if no light is detected by the photodiode or the equivalent device). Once the breakdown voltage is identified and recorded, the high voltage power supply is operated at a voltage greater than the recorded breakdown voltage. The greater voltage can be, in some scenarios, referred to as the "maximum voltage" (or, $V_{MAX}$) or, alternatively, the "operation voltage". Operating the high voltage power supply at the maximum voltage (i.e., above the breakdown voltage) can be useful for preventing the plasma from extinguishing within the gas flow.

When the high voltage power supply is operated at the maximum voltage, the light emitted by the plasma generated within the gas flow is detected for further analysis and processing.

In some embodiments, detecting the light emitted by the plasma is performed with a photodiode which can be part of an optical circuit, such as the one which has been presented in a previous section.

As it has been previously mentioned, the optical circuit can further include filter(s), narrow interference filters or optical sensor(s) including multiple bandpass filters, and the optical circuit is configured to convert the light (which is emitted by the plasma) received by the optical circuit to an electrical signal to be processed by a processor, as it will be described in greater detail below.

Figure 6:
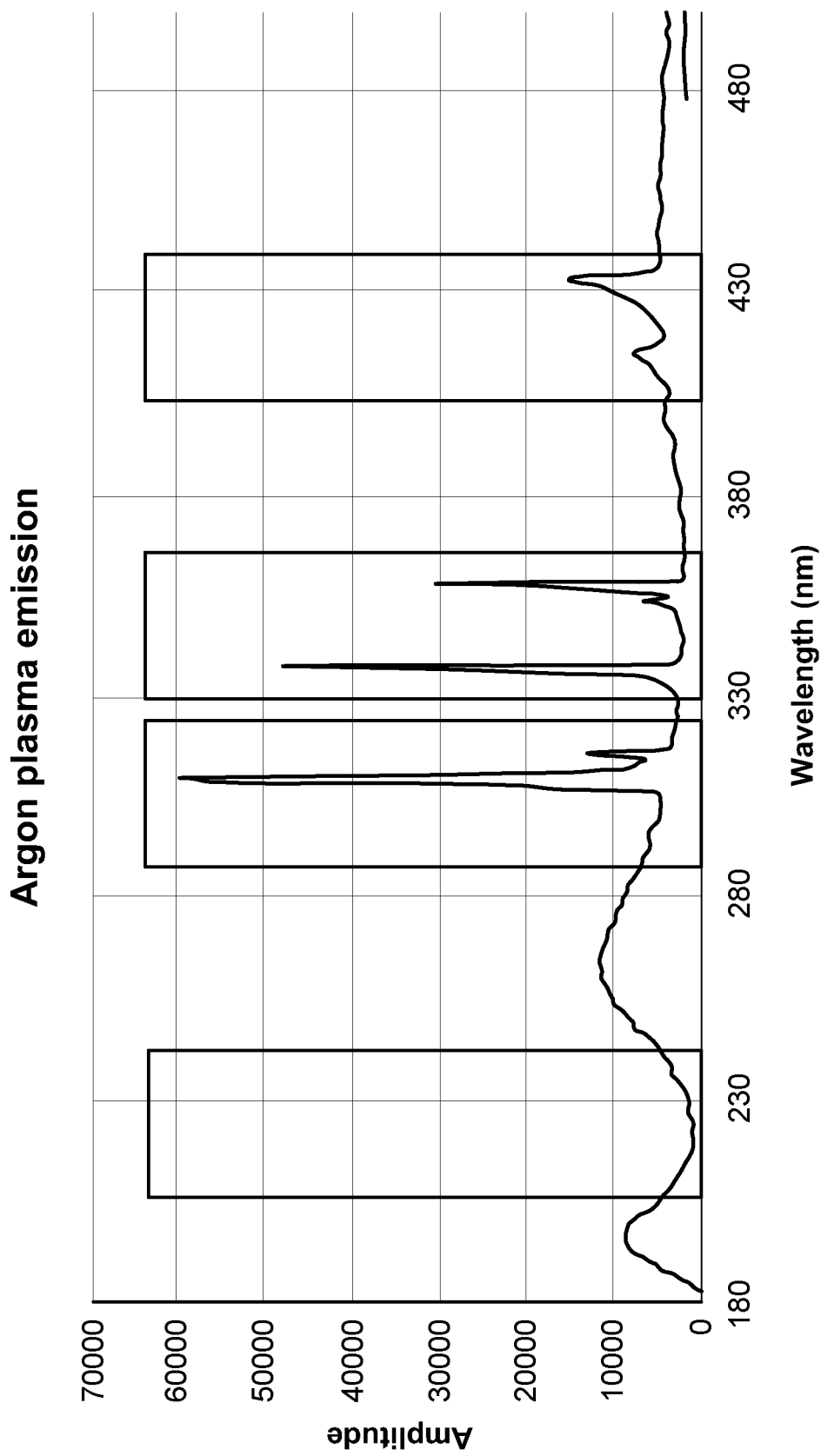
FIG. 6 illustrates an example of an optical emission spectrum of a plasma, as measured by an optical circuit, according to one embodiment.

Now referring to FIG. 6, an example of a result of the optical measurement made by the optical circuit is illustrated.

In the depicted example, the optical emission of a noble gas (e.g., argon) is presented. As it will be readily understood by one skilled in the art, the intensity of the light emitted by the plasma is wavelength-dependent, and the observable spectral lines are typically representative of the gas present in the gas flow (i.e., the spectral lines are characteristics of the gas). Hence, obtaining such an optical emission profile can be used to identify an unknown gas or, in some scenarios, a gas composition.

The optical circuit is configured to measure the optical properties (e.g., optical emission) of the light emitted by the plasma generated in the discharge chamber but can be further configured to convert the received light into an electrical signal.

In one example, a filter or filters may be provided in a path of the light extending from the plasma to the photodiode, such that only light having the desired spectral contents reaches the photodiode. In other examples, different configurations could be used to extract the spectral information from the optical detected signals, such as for example using a spectrometer or other spectrally resolved detector to convert the optical energy into analog or digital information.

In another example, the collected light is detected and processed as well known in the art. For example, light may be filtered by an interferential filter or the like, for example a bandpass filter centered on a wavelength or wavelength range to be monitored and detected by a photodiode converting the light to the electrical signal. In some variants, the entire spectral content of the collected light may be detected by the photodiode and the resulting light intensity value monitored.

Figure 7:
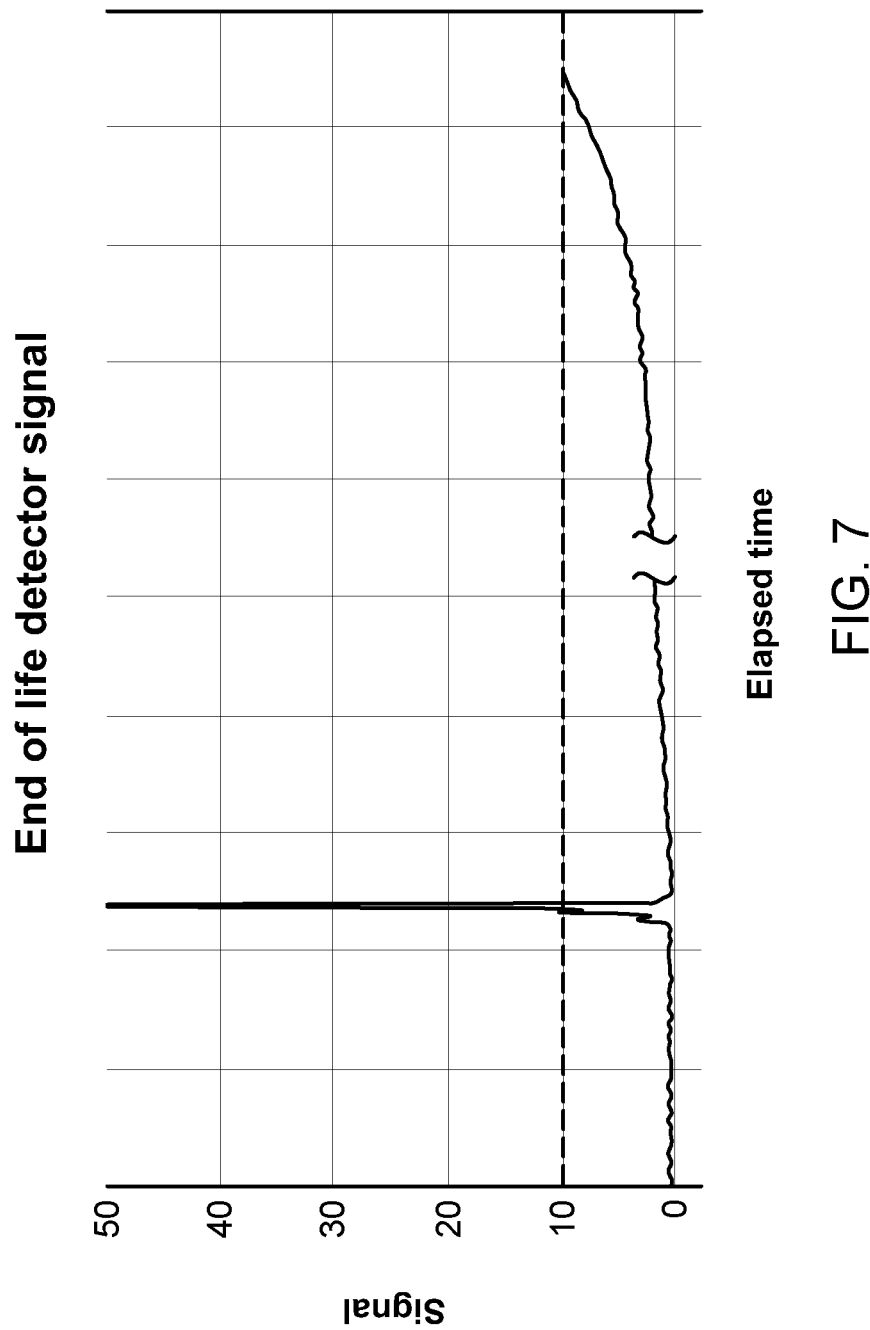
FIG. 7 shows a detector signal, according to one embodiment.

The method also includes a step of processing the electrical signal to obtain a detector signal. Once obtained, the detector signal can be displayed and monitored over time. An example of a detector signal is illustrated in FIG. 7.

If the monitoring identifies a variation of the detector signal, a step of producing a notification representative of a state of the piece of equipment to which the detector is coupled (e.g., the gas purifier) can be performed. Such variations can notably include a change in intensity, presence of a peak (e.g., an impurity peak), a drift in the baseline, or the like. The variations may reflect a change in a predetermined property of the gas flow, which can be, in turn, an indication of a dysfunction or a malfunction of the equipment to which the detector is associated.

One skilled in the art will readily understand that the intensity of the optical emission profile (as well as the breakdown voltage) may vary according to the gas pressure. To avoid any variation of the profile based on the pressure, the methods generally include compensating the baseline shifting of the monitored detector signal in relation to pressure change, so as to compensate the detector signal intensity accordingly and produce the compensated detector signal. Such a compensation can be achieved through the use of a compensation algorithm, as it has been previously indicated.

Figure 8:
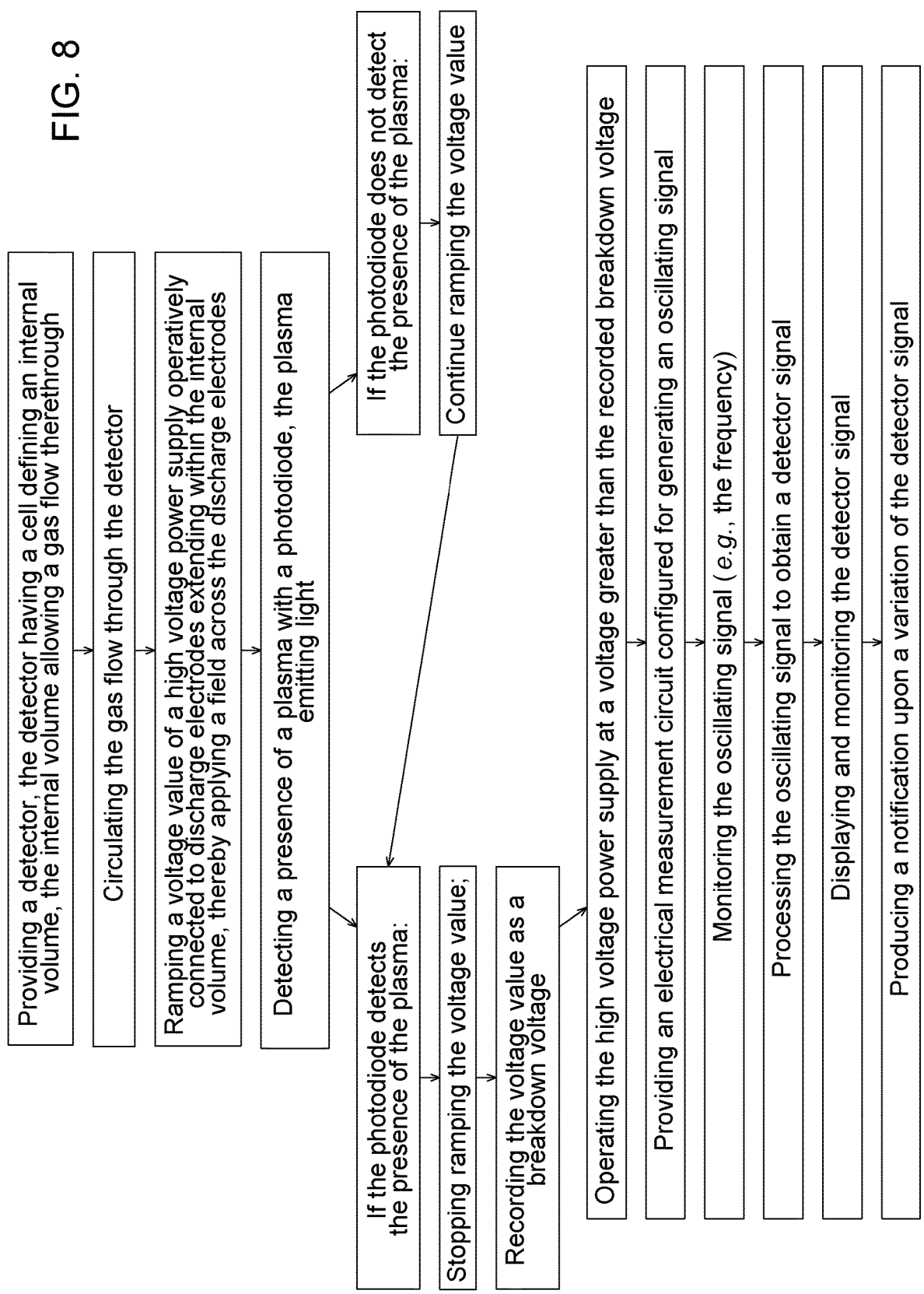
FIG. 8 is a flowchart of a method for measuring and monitoring properties of a gas flow traversing a plasma-based detector, according to one embodiment.

Further details on the electrical measurements will now be provided, and different embodiments of a method for electrically detecting and monitoring some properties of a gas flow will be described. Such a method will be simply referred to as "electrical measurements" in the present section, and will, for most part, be described with reference to FIG. 8 which illustrates a flowchart of a method for measuring and monitoring properties of a gas flow traversing the plasma-based detector.

As is the case for the optical measurements, the electrical measurements take place in the context of what have been referred to as the "three general steps", i.e., detecting the breakdown voltage, measuring the properties under investigation and providing delay.

More particularly, several steps of the electrical measurements are similar to the ones performed during the optical measurements. These steps are outlined in the following paragraphs. Unless indications to the contrary, the embodiments, variants and implementations as described having regard to the steps and/or substeps of the optical measurements are also relevant for the electrical measurements.

Broadly described, the electrical measurements also typically start with providing an plasma-based detector which is configured for allowing the injection of the gas flow within the detector and subsequently the ejection of the gas flow from the detector, namely circulating the gas flow thorough the discharge chamber of detector. Once the gas flow is circulating through the discharge chamber of the detector, a step of ramping a voltage value of the high voltage power supply is performed. The voltage value, as set by the variable high voltage power supply, is applied to the discharge electrodes through the discharge circuit, thereby applying an electrical field across the discharge electrodes, as it has been previously described. Upon application of the breakdown voltage, a plasma is generated within the gas flow, and then the step of ramping the voltage value is stopped. The minimal voltage value at which the plasma is generated is recorded as the breakdown voltage. This step normally includes detecting the plasma, for example, with a photodiode. When no plasma is detected, the step of ramping the voltage continues until the breakdown voltage is obtained.

As it has been previously introduced, the electrical measurements can be achieved with two different configurations, which have been referred to as the "DC operation mode" and the "AC operation mode".

In the DC operation mode, the variable high voltage supply is configured to generate a DC signal. Once the breakdown voltage is identified and recorded, the high voltage power supply is operated at the maximum voltage (i.e., a voltage value greater than the breakdown voltage), to avoid quenching of the plasma. It is to be noted that such quenching of the plasma can take place when a high level of impurity is introduced within the discharge chamber or following a sudden change (i.e., increase or decrease) in pressure in the detector. In this operation mode, the voltage value across the discharges electrodes cannot change (i.e., increase or decrease) once the plasma is ignited. Indeed, in this operation mode, if the current increases, the impedance decreases (or vice-versa), and so the voltage value remains substantially constant across the discharge electrodes. However, it is to be noted that the voltage value can vary in the modulation circuit (i.e., in the variable high voltage power supply and/or the discharge circuit).

In the "AC operation mode", the variable high voltage supply is configured to generate an AC signal. In this operation mode, the voltage value across the discharge electrodes can change (i.e. increase or decrease) once the plasma is ignited. Indeed, in this operation mode, if the current is increased, the voltage value (across the discharge electrodes) increases as well. It is to be noted that, in the AC operation mode, a small background current can be detected, even in the absence of a plasma within the discharge chamber. Such background current can, for example and without being limitative, a capacitive current.

Once the abovementioned steps are achieved, the electrical measurements can be performed.

The electrical measurements begin with providing an electrical measurement circuit. Similarly to the optical measurement circuit, the electrical measurement circuit could be provided at the output of the discharge chamber, i.e., could be placed downstream of the discharge chamber. Alternatively, the electrical circuit 37 and the discharge chamber 22 could be arranged in a parallel configuration.

Moreover, once the plasma is generated within the discharge chamber of the detector, an electrical current flows through the discharges electrodes. As such, a change in the properties of the plasma generated within the gas flow (e.g., a change in the electrical properties) will affect the oscillating signal generated by the discharge circuit 32. The different parameters of the oscillating signal (e.g., amplitude, intensity, period and/or the like) are thus dependent on the properties of the plasma generated within the discharge chamber. Hence, because the properties of the plasma are influenced by the properties of the gas flow, and because the properties of the plasma have an influence on the oscillating signal, one will readily understand that the properties of the gas flow will then have an impact on the oscillating signal. In this sense, the oscillating signal is representative of the gas flow circulating through the discharge chamber, and can thus be tracked.

More particularly, the subsequent step includes monitoring the oscillating signal. Indeed, because of its periodicity, the oscillating signal can be monitored. In one embodiment, the step of monitoring the oscillating signal includes monitoring the frequency (or, alternatively, the period) of the oscillating signal.

Figure 9A:
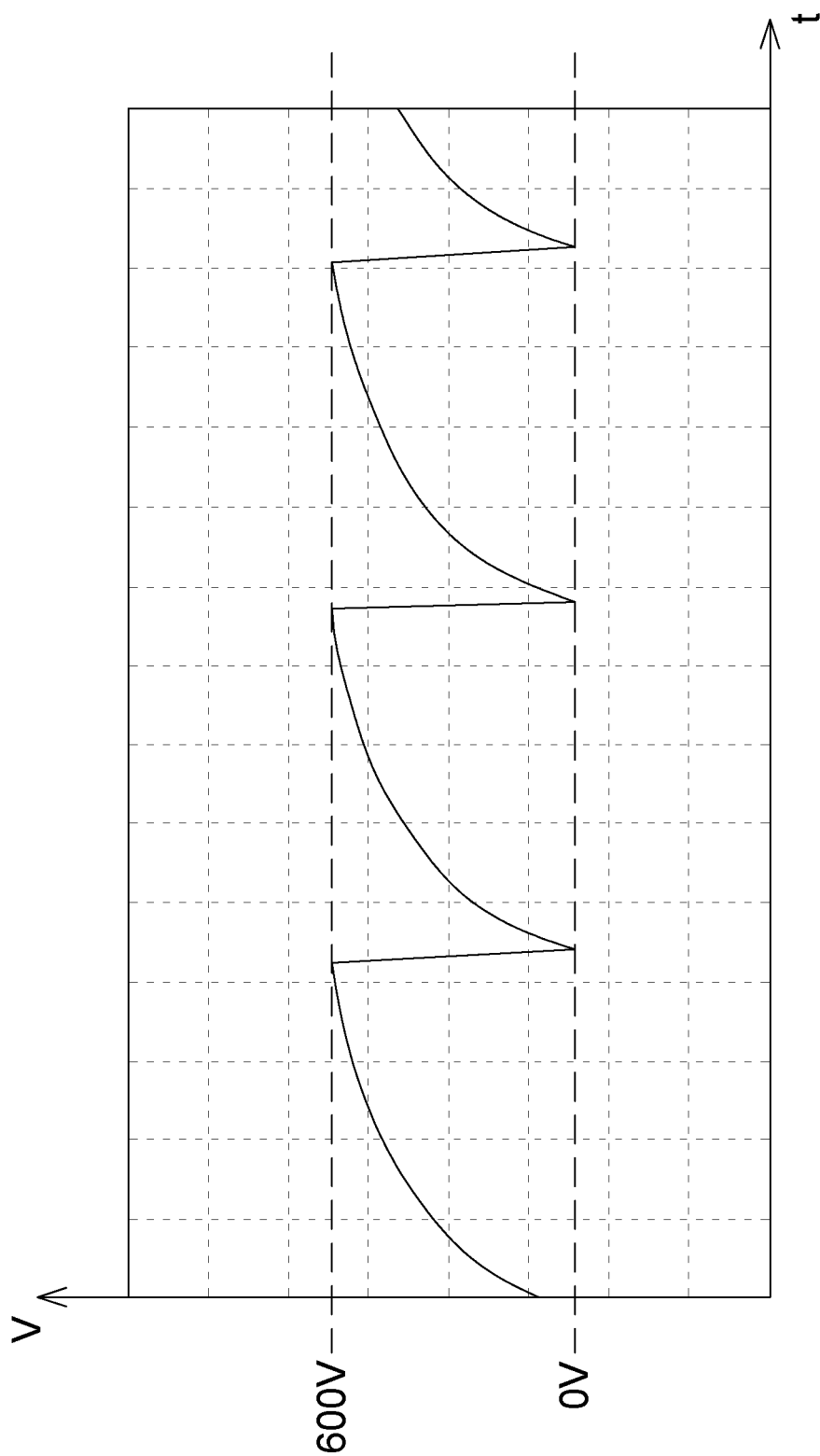
FIGS. 9A-B illustrate time-dependent voltage measurements representative of voltage characteristics of an argon gas and a helium gas, respectively.
Figure 9B:
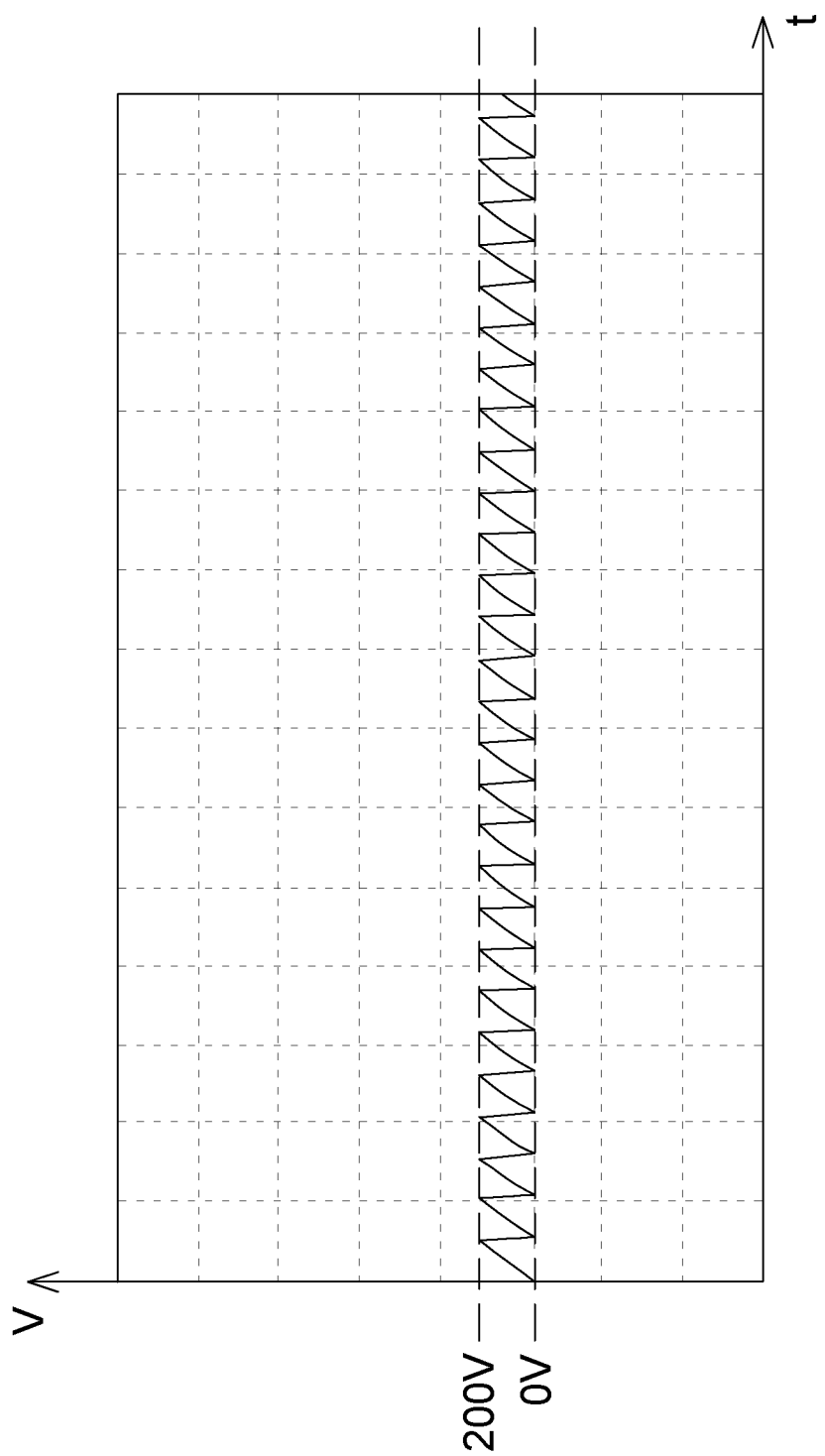

Now turning to FIGS. 9A-B, two examples of an oscillating signal are shown. In FIG. 9A, a time-dependent voltage measurement illustrates the oscillating signal that is generated when the gas flow includes only argon. As it can be observed, the amplitude of the oscillating signal is approximately 600 V, and the frequency of the oscillating signal is approximately 225 Hz. In FIG. 9B, a time-dependent voltage measurement illustrates the oscillating signal that is generated when the gas flow includes only helium. As it can be observed, the amplitude of the oscillating signal is approximately 200 V, and the frequency of the oscillating signal is approximately 1898 Hz.

As illustrated in FIGS. 9A-B, the properties of the oscillating signal (e.g., amplitude and frequency) depend on the nature of the gas flow, which means that the composition of the gas flow can be inferred from the properties of the oscillating signal, or that the properties of the oscillating signal can at least be used (e.g., in conjunction with other information) to identify a gas.

In some embodiments, the processor provided with the detector can be configured to have a memory which could include, for example, a database containing information about the oscillating signal which have been previously generated and monitored by the electrical measurement circuit, and the experimental conditions in which this information was obtained. This information then later be used to identify or infer the nature of a gas flow.

Figure 10A:
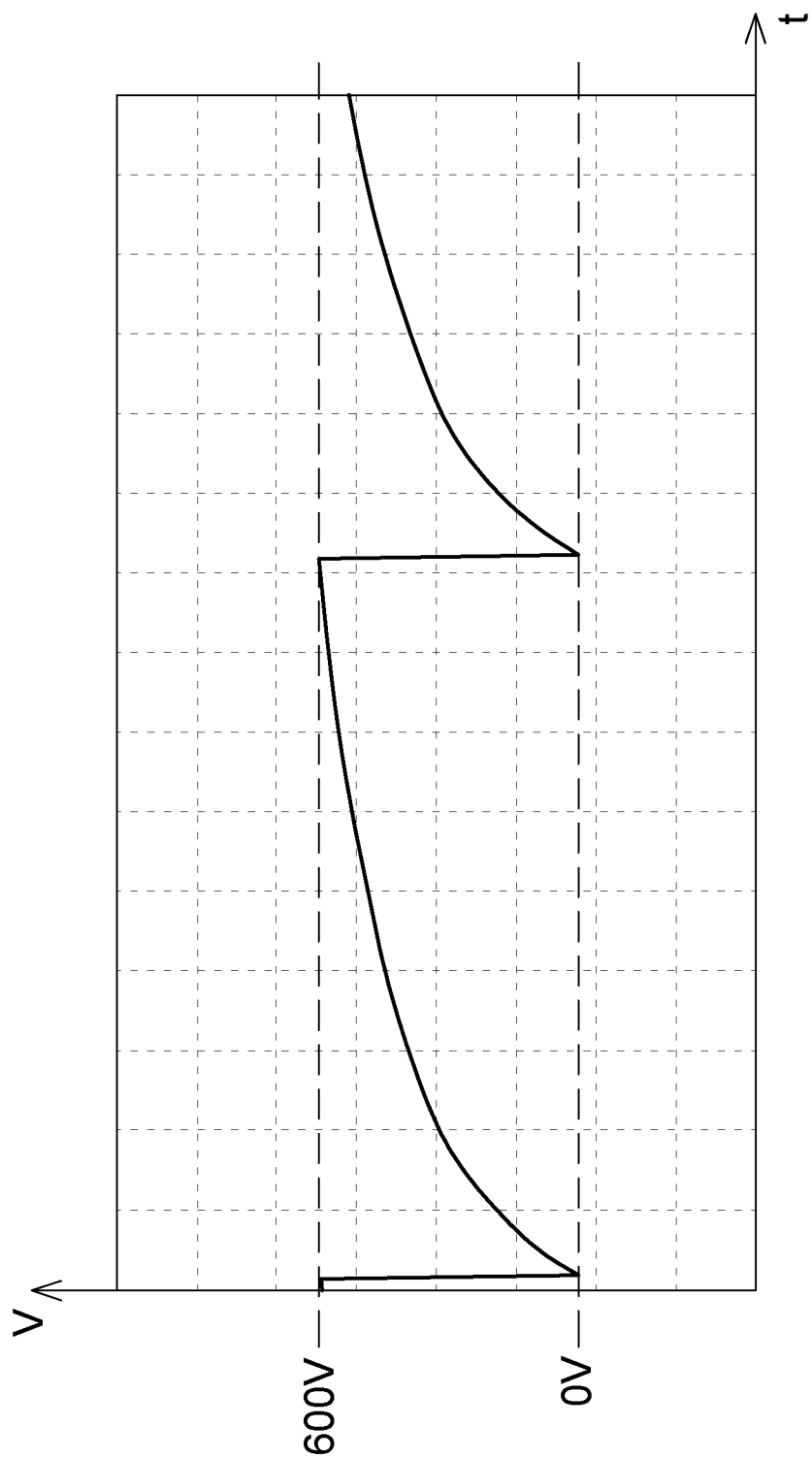
FIGS. 10A-B illustrate a time-dependent voltage measurement representative of voltage characteristics of a pure argon gas and an argon gas including $N_2$ impurities, respectively.
Figure 10B:
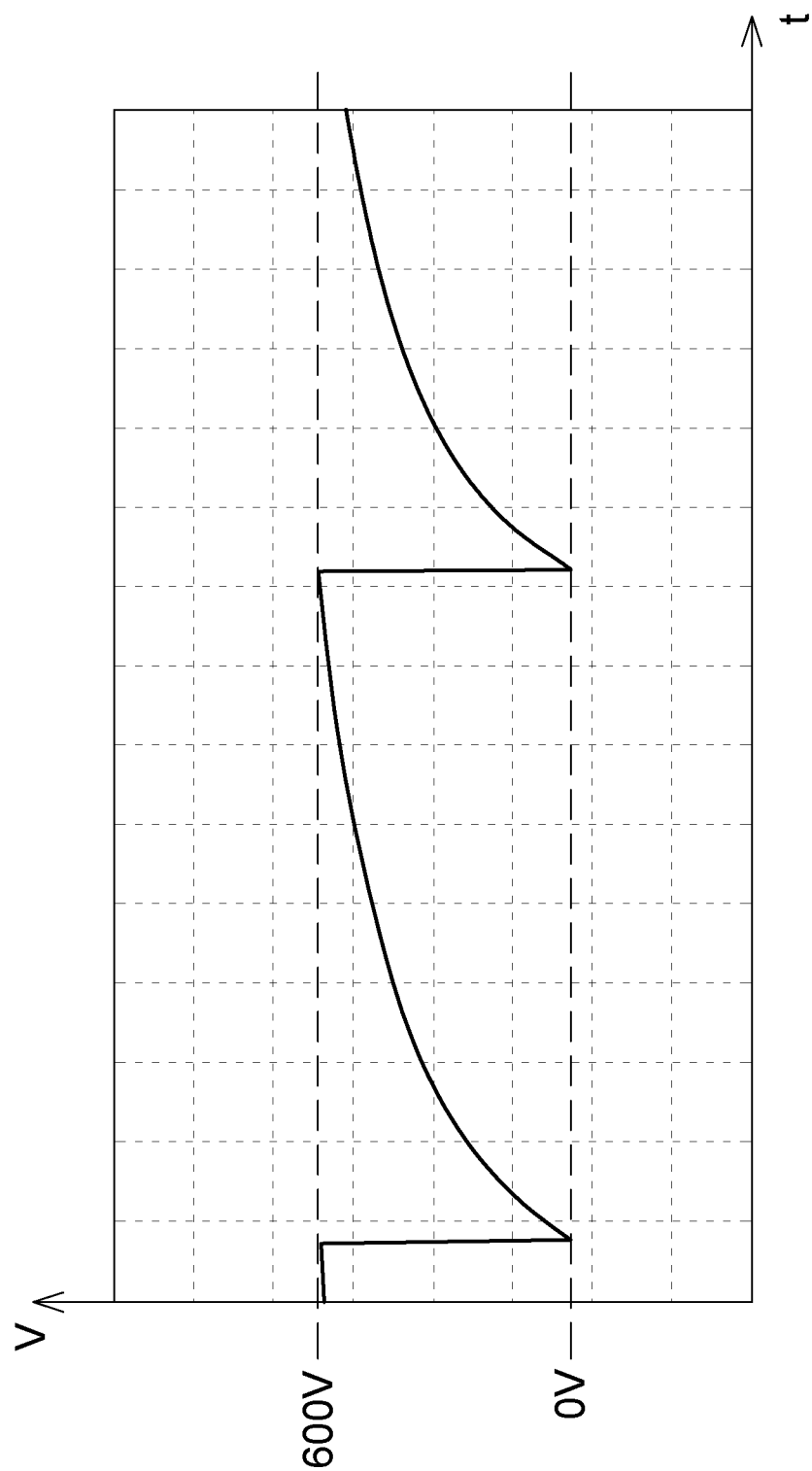

With reference to FIGS. 10A-B, two examples of an oscillating signal are shown. In FIG. 10A, a time-dependent voltage measurement illustrates the oscillating signal that is generated when the gas flow includes only argon. As it can be observed, the amplitude of the oscillating signal is approximately 600 V and the frequency of the oscillating signal is approximately 225 Hz. In FIG. 10B, a time-dependent voltage measurement illustrates the oscillating signal that is generated when the gas flow includes argon and a predetermined amount (e.g., 10 ppm) of $N_2$. As it can be observed, the amplitude of the oscillating signal is approximately 600 V, and the frequency of the oscillating signal is approximately 235 Hz.

As it can be seen in FIGS. 10A-B, the presence of an impurity in the gas flow can also be identified by monitoring the properties of the oscillating signal. Such properties can include but are not limited to amplitude and frequency of the oscillating signal.

The method also includes a step of processing the oscillating signal to obtain a detector signal. Once obtained, the detector signal can be displayed and monitored. An example of a detector signal is illustrated in FIG. 7.

Upon a variation of the detector signal, a step of producing a notification representative of a state of the piece of equipment to which the detector is coupled (e.g., the gas purifier) can be performed. Such variations can notably include a change in frequency, amplitude, presence of a peak (e.g., an impurity peak), a drift in the baseline, or the like. The variations may reflect a change in a predetermined property of the gas flow, which can be, in turn, an indication of a dysfunction or a malfunction of the equipment to which the detector is associated (e.g., the gas purifier).

In some embodiments, the plasma-based detector is configured to perform both the optical and the electrical measurements. Such embodiments of the method allow for optically and electrically detecting and monitoring the properties of the gas flow, which can be useful, for example, for providing more precise or complementary information about the gas flow, or the state of the purifier (or other piece of equipment) to which the detector is coupled.

The steps to be carried out to achieve these embodiments of the method notably include some of the steps which have been previously described, as for example the steps and substeps relating to the identification of the breakdown voltage and the operation of the variable high voltage power supply at a voltage greater than the breakdown voltage. It is to be noted that the variable high voltage power supply can be operated to generate an AC or a DC signal.

In such embodiments, the optical measurements and the electrical measurements can either be performed concomitantly or sequentially. For example, in the scenario in which the optical and the electrical measurements are performed concomitantly, the electrical signal and the oscillating signal, which are generated by the optical measurement circuit and the electrical measurement circuit, respectively, can be processed by the processor to obtain a single (i.e., only one) detector signal. In this context, the detector could be representative of the optical and the electrical measurements. In one alternative, the processor could be configured to generate, for example, two distinct detector signals. The first detector signal could be representative, for instance, of the optical measurements, while the second detector signal could be representative of the electrical measurements (or vice-versa).

In accordance with another implementation, the method for performing a measurement in the gas flow involves three steps, as it has been previously mentioned with reference to FIG. 3. The three steps, conjointly referred to as a "measuring sequence" are the following: obtaining the operating conditions, measuring properties of the gas flow and allowing for a delay between the beginning of a subsequent measuring sequence.

In the first step, the method includes obtaining the operating conditions required for the measuring step. While the step of obtaining the operating conditions is inherently performed prior to the measuring step, it will be readily understood that these two steps can either form a single integrated step or two separated steps, whereas the second step is subsequent to the first.

Figure 4:
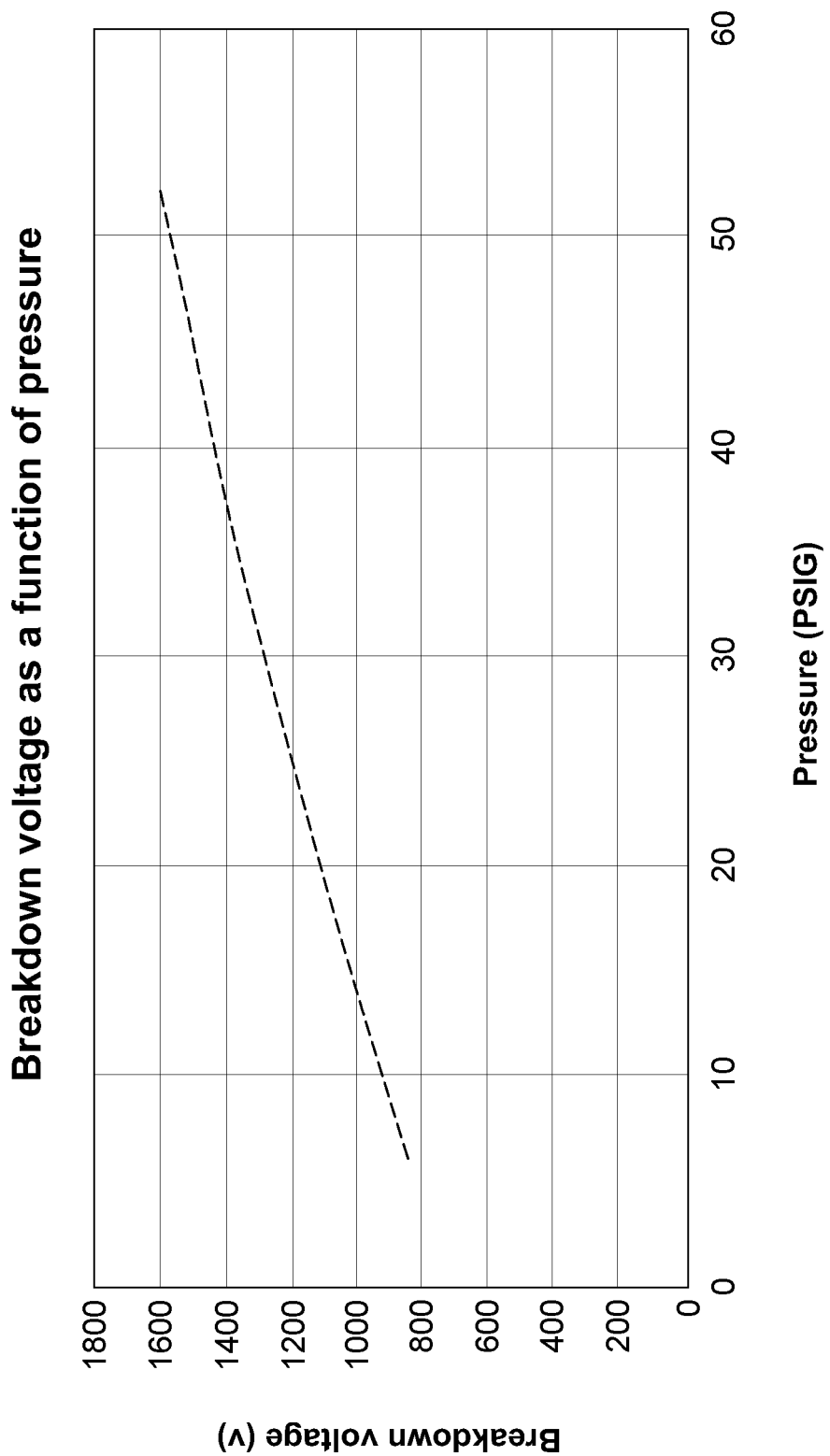
FIG. 4 illustrates the relationship between breakdown voltage of a gas flow circulating within a plasma-based detector and internal pressure of the gas flow within the plasma-based detector, according to one embodiment.

During the first step, the high voltage supply is ramped until the breakdown voltage is achieved. When the breakdown voltage is obtained, light emission occurs. More particularly, a plasma is generated within the cell of the detector. Indeed, the plasma emits light which is detected using the optical circuit. when the breakdown voltage (also referred to as "$V_{BD}$") is reached. As it has been previously mentioned, the breakdown voltage is pressure and gas type dependant, see for example FIG. 4 and FIGS. 9A-B, for nonlimitative example of this feature of the breakdown voltage. Once obtained, the breakdown voltage is recorded and can be used, for example by a pressure compensation algorithm for the gas quality determination and a gas type identification algorithm.

In DC operation mode, once the breakdown voltage is obtained, the voltage is set to a value above the breakdown voltage ($V_{MAX}$) to prevent the discharge from extinguishing, but also to use the same supply conditions (i.e., a constant supply voltage and current from one measurement sequence to another) for the optical measurement. Once the high voltage is set to the appropriate level ($V_{MAX}$), a gas measurement is done (i.e., a measurement sequence is initiated).

In AC operation mode, once the breakdown voltage is obtained, the voltage is set to a value above the breakdown voltage ($V_{MAX}$) to prevent the discharge from extinguishing, but also to use the same supply conditions (i.e., a constant supply voltage and current from one measurement sequence to another) for the optical measurement. Once the high voltage is set to the appropriate level ($V_{MAX}$), a gas measurement is done (i.e., a measurement sequence is initiated).

When used in the context of a "go-no-go application" (for identifying, for example, if the purifier is at a stage of imminent complete failure), the frequency of a self-oscillating circuit is used for the gas measurement. As the electric discharge (and the plasma resulting therefrom) is part of the oscillating circuit, any changes in the gas composition will influence (i.e. have an impact) on the self-oscillating frequency, as illustrated in FIGS. 10A-B.

For an application where a more precise measurement is required, the gas measurement is done based on the optical emission, as illustrated in FIG. 6. In one example, the optical emission measurement can be done using a broad interference filter, such as, and without being limitative, a red filter, a narrow interference filter, or an optical sensor having multiple bandpass filters. The optical sensor with multiple bandpass filters can be used to monitor multiple gas components simultaneously, and report a more detailed analysis.

Following the gas measurement and diagnostic (i.e., monitoring), the discharge is turned off, and a new (i.e., a subsequent) measurement sequence is started. A user-configurable delay between each measurement sequence can also be set (i.e., predetermined) in some applications. For example, a measurement can be needed to be perform every second, while in other applications, the measurement can be done once every minute, hour, or any other delay applicable in the targeted application. It is to be noted that when the discharge electrodes are coated with a dielectric material, a continuous monitoring could also be achieved with an AC excitation source, i.e., when the high voltage power supply is configured and operated to generate an AC signal.

Based on the various embodiments and implementations of the methods for measuring and monitoring the properties of the gas flow, it will be readily understood that various modes of operations can be considered. The following modes of operation are nonlimitative embodiments of methods for operating the detector.

Purifier End of Life Operation

In some implementations, the detector can be a low-cost and compact plasma-based detector coupled with a gas purifier. In such implementations, gas purity measurements (e.g., for measuring pressure and/or identifying the nature of the gas) can be performed for measurement compensation and purifier diagnostic in real-time, based on the gas flow breakdown voltage characteristics.

The gas measurement can either done based on the discharge self-oscillating frequency, which has also been referred to as the "oscillating signal", for Go/no go applications, or could alternatively use the optical measurements for more detailed and precise measurements.

The identification of the gas flow characteristic can also be used to provide the purifier with safety features and smart features, for example and without being limitative: sudden air pollution detection, purifier inlet pressure trends to predict that a gas delivery system is about to run out of gas, and/or no gas flow is provided to the purifier, which can result in damages and/or fire and/or other potential hazard(s).

Commissioning Operation

The detector can be useful and find many applications during commissioning of a gas purifier.

Indeed, during commissioning, the gas pipes upstream the gas purifier are often full of air, which could potentially lead to unwanted damages to the gas purifier at the purifier start-up.

In the commissioning operation mode, the detector is used in combination with two valves, such as the ones represented in FIG. 2.

For example, a first three-way valve V1 is used to connect the detector to the gas purifier inlet. A second valve V2 is used to interrupt the flow into the detector and pressurise it to the gas purifier inlet pressure.

During commissioning, the detector is initially connected to the gas purifier inlet to verify that a pressure is being applied to the purifier. This step is performed by pressurising the detector, which is achieved by closing the valve V2. Upon the confirmation that a pressure is applied to the purifier, the detector begins to monitor the gas being fed to the gas purifier by turning on the valve V2.

The abovementioned step is performed until air, which is normally contained in the gas pipes upstream the gas purifier is flushed, which is measured by the detector. Once the air is flushed from the gas pipes, the three-way valve V1 is switched to an open ("on") or a close ("off") configuration, depending on the type of valves being used to monitor the gas that is coming out of the purifier, and confirm that air has properly been flushed from the gas purifier. Once the detector signal is below a pre-defined threshold, the heater(s) provided with the gas purifier can be turned on.

The commissioning operation mode can then be useful, for example for preventing the user from damaging the purifier at start-up.

Normal Operation

During normal operation, the detector is used to monitor the gas quality at the output of the gas purifier by monitoring the gas flow that is flowing through and that is coming out of the detector. With reference to FIG. 2, this can be done continuously, for example by connecting the gas purifier outlet to the detector using V1 and activating the valve V2, so that the detector is continuously purged with a gas flow. As it has been previously mentioned, the optical and/or the electrical measurements can be performed continuously and compared against pre-defined threshold (e.g. which can be stored on the memory provided with the processor).

In some embodiments, the pre-defined thresholds are user configurable and adjusted depending on the minimum acceptable purity.

In some embodiments, the detector sensitivity can be normalised during manufacturing, for example by calibrating its response against predetermined gas standards. Upon the detection of divergence between the results from the measurements and the pre-defined thresholds, the detector can be configured to produce a notification.

Periodic Monitoring Operation

When the detector is provided as a kit including valves and is used conjointly with a gas purifier, the valves can be configured to periodically monitor the purifier inlet pressure, and so provide a diagnostic of the gas purifier. This diagnostic feature could be useful, for example to confirm that a gas flow is indeed being fed to the gas purifier, and also to identify a potential decrease in pressure. A decrease in pressure can be a sign that a volume of a gas bottle is getting low (i.e., is close to becoming empty), and needs to be changed. The diagnostic can be paired with the production of a warning signal or a notification to warn the user or an operator of a potential failure.

Catastrophic Failure Prevention Operation

Moreover, when the detector is used with a gas purifier, the detector can be operated to prevent catastrophic failure. For example, in some embodiments, the gas purifier can include a getter (sometimes referred to as a "hot getter"), which could be made of an alloy of Zr/Vn/Fe. If this allow is placed in contact with air, then an exothermal reaction can occur, which in turn results in an increase in temperature, and could potentially lead to a fire. This is even more the case if the air is being fed to the purifier for an extended period of time.

The detector presented in the current description allows, under the proper circumstances, to differentiate between different gas, and so if a catastrophic failure occurs, the detector can produce a notification warning the user or the operator, and can further be configured to turn off the gas purifier or to enter a safety protection mode. For example, the safety protection mode can include of turning off a heat source (sometimes referred to as the "heaters") provided with the gas purifier or the getter, until a predetermined gas flow is flowing into the detector, or after a predetermined temperature is obtained.

Several alternative embodiments and examples have been described and illustrated herein. The embodiments described above are intended to be exemplary only. A person skilled in the art would appreciate the features of the individual embodiments, and the possible combinations and variations of the components. A person skilled in the art would further appreciate that any of the embodiments could be provided in any combination with the other embodiments disclosed herein. The present examples and embodiments, therefore, are to be considered in all respects as illustrative and not restrictive. Accordingly, while specific embodiments have been illustrated and described, numerous modifications come to mind without significantly departing from the appended claims.

The invention claimed is:

1. A method for measuring a composition of a gas circulating through a plasma-based detector, the plasma-based detector having a discharge chamber defining an internal volume and having discharge electrodes configured to apply a plasma-generating field across the discharge chamber, the method comprising:
    ramping a voltage applied across the discharge electrodes until the voltage reaches a breakdown voltage, thereby generating a plasma in the internal volume, the plasma emitting light, the light being indicative of a presence of the plasma;
    collecting the light emitted by the plasma to detect the presence of the plasma;
    determining a pressure in the internal volume of the discharge chamber based on the breakdown voltage upon detection of the presence of the plasma;
    operating the detector at an operation voltage, the operation voltage being greater than the breakdown voltage;
    performing at least one of an optical measurement and an electrical measurement on the plasma and generating a detector signal based thereon; and
    compensating the detector signal based on the pressure in the internal volume of the discharge chamber to obtain a compensated detector signal, the compensated detector signal being representative of the composition of the gas.

2. The method of claim 1, wherein said performing said at least one of the optical measurement and the electrical measurement comprises electrically detecting and measuring an electrical current flowing through the plasma.

3. The method of claim 2, further comprising obtaining an oscillating signal based on the electrical current, wherein said generating the detector signal comprises processing the oscillating signal.

4. The method of claim 3, further comprising comparing said one or more properties of the oscillating signal with data provided in a database containing information about previously monitored oscillating signals.

5. The method of claim 1, further comprising recording the breakdown voltage in a database containing information about previously recorded breakdown voltage.

6. The method of claim 1, wherein said performing said at least one of the optical measurement and the electrical measurement comprises optically detecting the light emitted by the plasma and measuring an optical emission of the plasma, the optical emission being spectrally representative of gas species present in the gas.

7. The method of claim 6, wherein the optical emission is a spectral line, the spectral line being representative of one of said gas species.

8. The method of claim 6, wherein said optically detecting the light emitted by the plasma comprises filtering a spectral component of the light.

9. The method of claim 1, further comprising processing the compensated detector signal to obtain the composition of the gas.

10. The method of claim 1, wherein the voltage is supplied by a variable high voltage supply configured to generate a DC signal and wherein the voltage applied across the discharge electrodes remains constant once the plasma is generated.

11. The method of claim 1, wherein the voltage is supplied by a variable high voltage supply configured to generate an AC signal and wherein the voltage applied across the discharge electrodes is variable.

12. The method of claim 1, wherein determining the pressure comprises calculating a pressure value based on the breakdown voltage using Paschen's law.

13. The method of claim 1, wherein said compensating the detector signal based on the pressure in the internal volume of the discharge chamber to obtain the compensated detector signal is performed in real time.

14. A plasma-based detector for measuring a composition of a gas circulating through the plasma-based detector, the plasma-based detector comprising:
    a discharge chamber defining an internal volume for receiving the gas therein;
    discharge electrodes configured for applying a plasma-generating field across the discharge chamber;
    a variable high voltage power supply operatively connected to the discharge electrodes, the variable high voltage power supply being configured to ramp a voltage applied across the discharge electrodes until the voltage reaches a breakdown voltage, thereby generating a plasma in the internal volume, the plasma emitting light, the light being indicative of a presence of the plasma;
    a light collector for collecting the light emitted by the plasma and detecting the presence of the plasma;
    a measurement circuit configured to perform at least one of an optical measurement and an electrical measurement on the plasma and generate a detector signal based thereon; and
    a processor configured for:
        determining a pressure in the internal volume of the discharge chamber based on the breakdown voltage upon detection of the presence of the plasma; and compensating the detector signal based on the pressure in the internal volume to obtain a compensated detector signal, the compensated detector signal being representative of the composition of the gas.

15. The plasma-based detector of claim 14, wherein the measurement circuit is further configured for electrically detecting and measuring an electrical current flowing through the plasma.

16. The plasma-based detector of claim 15, wherein the measurement circuit is further configured for electrically obtaining an oscillating signal based on the electrical current and processing the oscillating signal.

17. The plasma-based detector of claim 14, wherein the processor is further configured for processing the compensated detector signal to obtain the composition of the gas.

18. The plasma-based detector of claim 14, wherein the variable high voltage supply is configured to generate a DC signal and wherein the voltage applied across the discharge electrodes remains constant once the plasma is generated.

19. The plasma-based detector of claim 14, wherein the variable high voltage supply is configured to generate an AC signal and wherein the voltage applied across the discharge electrodes is variable.

20. The plasma-based detector of claim 14, wherein determining the pressure comprises calculating a pressure value based on the breakdown voltage using Paschen's law.

21. The plasma-based detector of claim 14, wherein the processor is configured for compensating the detector signal based on the pressure in the internal volume of the discharge chamber in real time.

* * * * *